United States Patent
Watanabe et al.

(10) Patent No.: US 6,296,943 B1
(45) Date of Patent: Oct. 2, 2001

(54) METHOD FOR PRODUCING COMPOSITE SOL, COATING COMPOSITION, AND OPTICAL ELEMENT

(75) Inventors: Yoshitane Watanabe; Keitaro Suzuki; Yoshinari Koyama; Motoko Iijima, all of Funabashi (JP)

(73) Assignee: Nissan Chemical Industries, Ltd., Tokoyo (JP)

( * ) Notice: Subject to any disclaimer, the term of this patent is extended or adjusted under 35 U.S.C. 154(b) by 0 days.

(21) Appl. No.: 09/380,403

(22) PCT Filed: Feb. 26, 1998

(86) PCT No.: PCT/JP98/00768

§ 371 Date: Sep. 1, 1999

§ 102(e) Date: Sep. 1, 1999

(87) PCT Pub. No.: WO98/39253

PCT Pub. Date: Sep. 11, 1998

(30) Foreign Application Priority Data

| Mar. 5, 1994 | (JP) | 9-50172 |
| Mar. 3, 1997 | (JP) | 9-47832 |
| Mar. 3, 1997 | (JP) | 9-47833 |
| Mar. 4, 1997 | (JP) | 9-49214 |
| Mar. 4, 1997 | (JP) | 9-49215 |
| Mar. 5, 1997 | (JP) | 9-50173 |

(51) Int. Cl.[7] .............. B32B 9/04; B01F 3/12; C09D 1/00

(52) U.S. Cl. .......... 428/447; 428/429; 516/88; 516/90; 106/286.4; 106/287.14; 106/287.16

(58) Field of Search ............... 516/92, 77–97; 106/286.4, 287.34, 287.14, 287.16; 428/428, 429, 447, 448

(56) References Cited

U.S. PATENT DOCUMENTS 6,114,440 * 9/2000 Yamaya et al. ............... 524/865

FOREIGN PATENT DOCUMENTS

| 53-11336 | 9/1978 | (JP) . |
| A-55-13747 | 1/1980 | (JP) . |
| A-56-166214 | 12/1981 | (JP) . |
| B2-57-54901 | 11/1982 | (JP) . |
| A-59-133211 | 7/1984 | (JP) . |
| B2-57-23611 | 5/1985 | (JP) . |
| A-60-199016 | 10/1985 | (JP) . |
| B2-63-37142 | 7/1988 | (JP) . |
| A-63-275682 | 11/1988 | (JP) . |
| B2-1-54021 | 11/1989 | (JP) . |
| A-1-301517 | 12/1989 | (JP) . |
| A-2-151801 | 6/1990 | (JP) . |
| A-2-178219 | 7/1990 | (JP) . |
| 02255532-A * | 10/1990 | (JP) ................ 423/71 |
| B2-4-27168 | 5/1992 | (JP) . |
| B2-4-45453 | 7/1992 | (JP) . |
| A-5-29363 | 2/1993 | (JP) . |
| A-6-107498 | 4/1994 | (JP) . |
| 09005501-A * | 1/1997 | (JP) ................ B29D/11/00 |

* cited by examiner

Primary Examiner—Robert Dawson
Assistant Examiner—Michael J Feely
(74) Attorney, Agent, or Firm—Oliff & Berridge, PLC

(57) ABSTRACT

The present invention relates to a method for producing titanium oxide ($TiO_2$)-tin oxide ($SnO_2$) composite sol, a titanium oxide ($TiO_2$)-zirconium oxide ($ZrO_2$)-tin oxide ($SnO_2$) composite sol, and a titanium oxide ($TiO_2$)-cerium oxide ($CeO_2$)-tin oxide ($SnO_2$) composite sol. Further, the present invention relates to a coating composition containing any of the above-mentioned composite sols for forming coating films that are excellent in marring resistance, surface hardness, wearing resistance, transparency, heat resistance, light-resistant, weatherability, or water resistance on optical elements such as lenses for glasses and cameras, automotive windowpane, or optical filters attached to liquid-crystal displays, plasma displays, etc. and to optical elements having a cured film of the coating composition on the surfaces.

14 Claims, No Drawings

METHOD FOR PRODUCING COMPOSITE SOL, COATING COMPOSITION, AND OPTICAL ELEMENT

TECHNICAL FIELD

The present invention relates to a method for producing titanium oxide ($TiO_2$)-tin oxide ($SnO_2$) composite sol, a titanium oxide ($TiO_2$)-zirconium oxide ($ZrO_2$)-tin oxide ($SnO_2$) composite sol, and a titanium oxide ($TiO_2$)-cerium oxide ($CeO_2$)-tin oxide ($SnO_2$) composite sol.

The composite sols obtained by the present invention can be used for applications such as a component of a high refractive index hard coat agent applied to a surface of plastics lenses, films or plastics molded parts, a component of a high refractive index antireflection films, a surface treating agent for glass or ceramics, a catalyst or a binder for catalysts, a starting material for various fine ceramics, an inorganic anion exchanger, etc.

And it relates to a coating composition for obtaining coating films that are excellent in marring resistance, surface hardness, wearing resistance, transparency, heat resistance, light-resistant, weatherability, or water resistance on optical elements such as lenses for glasses and cameras, automotive windowpane, or optical filters attached to liquid-crystal displays, plasma displays, etc. and to optical elements including such a coating composition. It also relates to a coating composition that forms a coated product having excellent resistance to hot water whose weatherability and resistance to light are not decreased even when a vacuum evaporated film of an inorganic oxide (antireflection film, etc.) is provided thereon and to an optical element having the coated product.

BACKGROUND ART

To improve a surface of plastics lenses that have been used increasingly frequently in recent years, metal oxide sols having a high refractive index are used as a component of a hard coat agent applied to the surface thereof.

For example, Japanese Patent Publication No. Sho 63-37142 describes a molded part having a transparent cover layer containing fine inorganic substance particles comprised by at least one metal oxide selected from Al, Ti, Zr, Sn and Sb having a particle size of 1 to 300 nm.

Japanese Patent Publication No. Hei 4-27168 discloses crystalline titanium oxide-tin oxide sol having particles with a particle size of 50 nm or less. This is obtained by a method in which a water-soluble titanium compound and a water-soluble tin compound are reacted with an alkali metal hydroxide or its carbonate and/or an ammonium compound and hydrothermally treated.

Japanese Patent Publication No. Hei 5-29363 discloses a cosmetic having incorporated therein a titanium oxide-cerium oxide composite sol obtained by adding hydrogen peroxide to a dispersion of titanium oxide hydrate and cerium oxide hydrate to dissolve the titanium oxide hydrate and cerium oxide hydrate and heating the solution.

Further, Japanese Patent Application Laid-open No. Hei 2-178219 and Japanese Patent Publication No. Hei 4-45453 disclose a method for producing a titanium oxide-iron oxide composite sol.

In the above-mentioned prior art, the metal oxide particles comprised by Al, Ti, Zr, Sn, Sb, etc. having a particle size of 1 to 300 nm described in Japanese Patent Publication No. Sho 63-37142 are undesirable since where they are coated on a plastics substrate and cured, the resulting coating film has insufficient water resistance even when they are used each alone as a component of a hard coat agent. Also, when high refractive titanium oxide is used in this application, its primary particle size must be 20 nm or less, preferably 15 nm or less in relation to transparency. However, a problem arises that it is colored to blue color when irradiated with ultraviolet rays.

In the case where the sols described in Japanese Patent Publication No. Hei 4-45453, Japanese Patent Application Laid-open No. Hei 2-178219 and Japanese Patent Publication No. Hei 5-29363 are used, addition of a small amount of iron oxide or cerium oxide to the titanium oxide can inhibit the discoloration attributable to the irradiation of ultraviolet rays. However, because of the iron oxide or cerium oxide added in such an amount as can inhibit the coloration, the sols themselves are colored to brown or yellow and coating films prepared from them are also colored to and are undesirable.

Also, the crystalline titanium oxide-tin oxide sol described in Japanese Patent Publication No. Hei 4-27168 is undesirable in that hydrothermal treatment at 100° C. or higher is essential to convert it into a composite form, with the result that firm and stable secondary flocculates are generated to considerably decrease the transparency of the resulting sol.

Whereas plastic molded products are used in large amounts making the best of their advantages such as lightness in weight, ready processing, and impact resistance, on the contrary, they have defects that their hardness is insufficient and they tend to be marred, corroded by solvents, electrically charged to adsorb dusts, have insufficient heat resistance and so on, so that they are less sufficient in practical use as lenses for glasses windowpanes, etc. than inorganic glass molded parts.

Accordingly, it has been proposed to provide a protective coat on plastic molded parts. So many kinds of coating compositions have been proposed for use as a coat and for example, a coating composition containing an organosilicon compound or its hydrolysates as a main component (resin component or coating film-forming component) has been used as a hard coat for lenses for glasses. However, this coating agent has insufficient marring resistance. Further, Japanese Patent Application Laid-open No. Sho 53-111336 discloses use of a coating agent containing colloidal silica particles obtained by addition of silica sol as a hard coat for lenses for glasses.

Conventionally, plastic lenses for glasses have mostly been produced by cast polymerization of diethylene glycol bisallyl carbonate in the state of monomer. The lens thus produced has a refractive index of about 1.50, which is lower than the refractive index of glass lens being 1.52, so that there arises the problem that in the case of lenses for glasses for short sight the thickness of frame increases. For this reason, recently, the development of monomers having a higher refractive index than that of diethylene glycol bisallyl carbonate have been promoted. Such high refractive resin materials are disclosed in, for example, Japanese Patent Application Laid-opens No. Sho 55-13747, No. Sho 56-166214, No. Sho 57-23611, No. Sho 57-54901, No. Sho 59-133211, No. Sho 60-199016 and No. Sho 64-54021.

In contrast to high refractive lenses using the above-described high refractive resin materials, Japanese Patent Application Laid-opens No. Sho 62-151801 and No. Sho 63-275682 disclose coating agents containing a colloidal dispersion of fine particles of an oxide of a metal such as Sb or Ti.

The coating agent containing colloidal silica by addition of a silica sol has such a problem that a film obtained by coating and curing the coating agent generates interference fringes, making the appearance of the lens unacceptable. Also, in the case of lenses, it is often the case that an antireflection film (a multilayer structure film comprising inorganic oxide thin films based on the optical interference theory) is provided on the coating film. In this case, there has been such a problem that the antireflection film has a reflection color, for example, very pale green, and the reflection color varies and is uneven depending on the position on the surface of the lens.

In a coating agent containing colloidal tin oxide by addition of a tin oxide sol, the tin oxide sol has low compatibility with organosilicon compounds such as silane coupling agent or silicon-containing substances such as the hydrolysates of organosilicon compounds and therefore, it has decreased stability, with the result that films obtained by coating and curing the coating agent have insufficient water resistance.

In the coating agent containing colloidal titanium oxide by addition of a titanium oxide sol, the titanium oxide sol has also low compatibility with organosilicon compounds such as silane coupling agent or silicon-containing substances such as the hydrolysates of organosilicon compounds and therefore, it has decreased stability, with the result that films obtained by coating and curing the coating agent have insufficient water resistance. Also, there has been the problem that it is discolored to blue by irradiation with ultraviolet rays.

The coating agent containing colloidal antimony oxide by addition of an antimony oxide sol has improved stability because compatibility between the antimony oxide sol and organosilicon compounds such as silane coupling agent or silicon-containing substances such as the hydrolysates of organosilicon compounds is high. However, there is such a problem that films obtained by coating and curing the coating agent have insufficient refractive index.

The present invention is to provide a coating composition that gives rise to a film showing no interference fringes and having no irregularity in reflection color, the film being obtained by coating and curing the coating agent on a high refractive optical element that uses a high refractive resin material having a high refractive index of $n_D$=1.54 to 1.70 and an optical element utilizing the coating composition.

Also, the present invention is to provide a coating composition for plastics that is excellent in marring resistance, surface hardness, wear resistance, flexibility, transparency, antistatic properties, dyeability, heat resistance, water resistance, chemical resistance, etc. and an optical element utilizing the coating composition. In particular, the present invention is to provide a coating agent that gives rise to a film that is excellent in marring resistance, adhesion, water resistance, transparency, light resistance and generates no interference fringe.

The present invention provides a method for producing composite sols, coating compositions utilizing such composite sols, and optical elements that can obviate the above-mentioned problems.

DISCLOSURE OF THE INVENTION

A first invention of the present application as claim 1 relates to a method for producing a titanium oxide-tin oxide composite sol, comprising reacting a titanium salt and metallic tin in the presence of hydrogen peroxide in an aqueous medium.

As claim 2, it relates to a method for producing a titanium oxide-tin oxide composite sol, comprising the steps (a), (b) and (c):

(a): simultaneously or alternately adding aqueous hydrogen peroxide and metallic tin to an aqueous titanium salt solution while retaining a $H_2O_2$/Sn molar ratio at 2 to 3 to generate an aqueous titanium-tin basic salt solution containing a titanium component and a tin component in terms of $TiO_2$ and $SnO_2$ in a $TiO_2/SnO_2$ molar ratio of 0.25 to 10 and a total concentration of 5 to 50% by weight in terms of $TiO_2$ and $SnO_2$, (b): retaining the aqueous titanium-tin basic salt solution obtained in the step (a) at a temperature of 50 to 100° C. over 0.1 to 100 hours to generate a flocculate of a titanium oxide-tin oxide composite colloid, and (c): removing electrolytes in a slurry of the flocculate of the titanium oxide-tin oxide composite colloid generated in the step (b).

A second invention of the present application as claim 3 relates to a method for producing a titanium oxide-zirconium oxide-tin oxide composite sol, comprising reacting a titanium salt, a zirconium oxysalt and metallic tin in the presence of hydrogen peroxide in an aqueous medium.

Also, as claim 4, it relates to a method for producing a titanium oxide-zirconium oxide-tin oxide composite sol, comprising the steps (a'), (b') and (c'):

(a'): simultaneously or alternately adding aqueous hydrogen peroxide and metallic tin to a mixed aqueous solution of a titanium salt and a zirconium oxysalt while retaining a $H_2O_2$/Sn molar ratio at 2 to 3 to generate an aqueous titanium-zirconium-tin basic salt solution containing a titanium component, a zirconium component and a tin component in terms of $TiO_2$, $ZrO_2$ and $SnO_2$ in a $ZrO_2/TiO_2$ molar ratio of 0.05 to 1.0 and in a $TiO_2/(ZrO_2+SnO_2)$ molar ratio of 0.25 to 10 and a total concentration of 5 to 50% by weight in terms of $TiO_2$, $ZrO_2$ and $SnO_2$, (b'): retaining the aqueous titanium-zirconium-tin basic salt solution obtained in the step (a') at a temperature of 50 to 100° C. over 0.1 to 100 hours to generate a flocculate of a titanium oxide-zirconium oxide-tin oxide composite colloid, and (c'): removing electrolytes in a slurry of the flocculate of a titanium oxide-zirconium oxide-tin oxide composite colloid generated in the step (b').

A third invention of the present application as claim 5 relates to a method for producing a titanium oxide-cerium oxide-tin oxide composite sol, comprising reacting a titanium salt, a cerium salt and metallic tin in the presence of hydrogen peroxide in an aqueous medium.

Also, as claim 6, it relates to a method for producing a titanium oxide-cerium oxide-tin oxide composite sol, comprising the steps (a"), (b") and (c"):

(a"): simultaneously or alternately adding aqueous hydrogen peroxide and metallic tin to a mixed aqueous solution of a titanium salt and a cerium salt while retaining a $H_2O_2$/Sn molar ratio at 2 to 3 to generate an aqueous titanium-cerium-tin basic salt solution containing a titanium component, a cerium component and a tin component in terms of $TiO_2$, $CeO_2$ and $SnO_2$ in a $CeO_2/TiO_2$ molar ratio of 0.01 to 0.5 and in a $TiO_2/(CeO_2+SnO_2)$ molar ratio of 0.25 to 10 and a total concentration of 5 to 50% by weight in terms of $TiO_2$, $CeO_2$ and $SnO_2$, (b"): retaining the aqueous titanium-cerium-tin basic salt solution obtained in the step (a") at a temperature of 50 to 100° C. over 0.1 to 100 hours to generate a flocculate of a titanium oxide-cerium oxide-tin oxide composite colloid, and (c"): removing electrolytes in a slurry of the flocculate of a titanium oxide-cerium oxide-tin oxide composite colloid generated in the step (b").

A fourth invention of the present application as claim 7 relates to a coating composition comprising the following components (A) and (B):

component (A): at least one silicon-containing substance selected from the group consisting of organosilicon compounds of the formula (I):

$(R^1)_a(R^3)_b Si(OR^2)_{4-(a+b)}$     (I)

(wherein $R^1$ and $R^3$ independently represent an alkyl group, an aryl group, a halogenated alkyl group, a halogenated aryl group, an alkenyl group, or an organic group having an epoxy group, an acryloyl group, a methacryloyl group, a mercapto group, an amino group or a cyano group and bonded to the silicon atom through an Si—C bond, $R^2$ represents an alkyl group, an alkoxyalkyl group, or an acyl group and contains 1 to 8 carbon atoms, a and b independently represent an integer of 0, 1, or 2, and a+b is an integer of 0, 1, or 2) and the formula (II):

$[(R^4)_c Si(OX)_{3-c}]_2 Y$     (II)

(wherein $R^4$ represents an alkyl group having 1 to 5 carbon atoms, X represents an alkyl group or an acyl group and contains 1 to 4 carbon atoms, Y represents a methylene group or an alkylene group having 2 to 20 carbon atoms, and c represents an integer of 0 or 1) and hydrolysates thereof, component (B): a titanium oxide-tin oxide composite colloid particle having a primary particle size of 2 to 20 nm.

A fifth invention of the present application as claim 8 relates to a coating composition comprising the above-described component (A) and the following component (B'):
component (B'): a titanium oxide-zirconium oxide-tin oxide composite colloid particle having a primary particle size of 2 to 20 nm.

A sixth invention of the present application as claim 9 relates to a coating composition comprising the above-described component (A) and the following component (B"):
component (B"): a titanium oxide-cerium oxide-tin oxide composite colloid particle having a primary particle size of 2 to 20 nm.

A seventh invention of the present application as claim 10 relates to an optical element having on the surface thereof a cured film comprising the coating composition described in claim 7.

An eighth invention of the present application as claim 11 relates to an optical element having on the surface thereof a cured film comprising the coating composition described in claim 8.

A ninth invention of the present application as claim 12 relates to an optical element having on the surface thereof a cured film comprising the coating composition described in claim 9.

BEST MODE FOR CARRYING OUT THE INVENTION

The titanium salt used in the step (a) in the first invention of the present application includes titanium tetrachloride, titanium sulfate, titanium nitrate, etc. These titanium salts are used preferably as an aqueous solution.

The metallic tin may be used in the form of powder or granules. For example, use may be made of metallic tin powder obtained by an atomization method in which an ingot is molten, sprayed and solidified, and flake-like metallic tin powder is produced by cutting an ingot using a lathe or a rasp.

The hydrogen peroxide may be a commercially available 35% by weight aqueous solution, which is used at any desired concentration.

The step (a) is a step in which aqueous hydrogen peroxide and metallic tin are added to an aqueous titanium salt solution simultaneously or alternately to obtain an aqueous titanium-tin basic salt solution. In a reactor equipped with a stirrer is charged an aqueous titanium salt solution, to which aqueous hydrogen peroxide and metallic tin are added through separate inlets simultaneously or alternately with stirring. Since a slurry containing the aqueous basic salt solution in the step (a) and the titanium oxide-tin oxide composite colloid flocculate in the subsequent step (b) is acidic, it is preferred that the reactors used in the steps are a glass reaction apparatus or a glass lined (enameled) reaction apparatus.

The aqueous hydrogen peroxide and the metallic tin are added to the aqueous titanium salt solution while retaining the $H_2O_2$/Sn molar ratio of at 2 to 3. More particularly, it is raised a portionwise addition method in which a series of steps of collecting a 1/3 to 1/30 part by weight portion based on total parts by weight of each of the aqueous hydrogen peroxide and the metallic tin to be added, adding the aqueous hydrogen peroxide to the aqueous titanium salt solution, subsequently adding the metallic tin thereto, and performing reaction for 2 to 20 minutes are repeated 3 to 30 times. Moreover, it is raised a portionwise addition method in which a series of steps of collecting a 1/3 to 1/30 part by weight portion based on total parts by weight of each of the aqueous hydrogen peroxide and the metallic tin to be added, adding the metallic tin to the aqueous titanium salt solution, subsequently adding aqueous hydrogen peroxide thereto, and performing reaction for 2 to 20 minutes are repeated 3 to 30 times. In this case, if the total amount of hydrogen peroxide is added in one time to acidic titanium salt solution and then metallic tin is added thereto, most part of hydrogen peroxide is decomposed in an initial stage of the reaction, so that the amount of the hydrogen peroxide is deficient and the decomposition reaction of hydrogen peroxide is an exothermic reaction and hence such is dangerous and undesirable. The reaction is possible at a $H_2O_2$/Sn molar ratio of a little above 3. However, if said molar ratio is greatly above it is undesirable from the above-mentioned reasons. A $H_2O_2$/Sn molar ratio of below 2 results in insufficient oxidation and hence such is undesirable. As for the time of addition, for example, the aqueous hydrogen peroxide and metallic tin may be added over 0.4 to 10 hours, preferably 0.4 to 5 hours, when an aqueous titanium salt solution in which 1 mol of titanium salt is dissolved is used. If the time of addition is less than 0.4 hour, the exothermic reaction is too vigorous to be controlled and unreacted metallic tin tends to remain and hence such is undesirable. Also, the time of addition may be more than 10 hours, but such is uneconomical and hence it is undesirable.

The titanium-tin basic salt generated in the step (a) may contain a titanium component and a tin component in terms of titanium-oxide ($TiO_2$) and tin-oxide ($SnO_2$) in a $TiO_2$/$SnO_2$ molar ratio of 0.25 to 10, preferably 0.4 to 4.0. If this molar ratio is below 0.25, the aqueous titanium-tin basic salt solution can be prepared but the molar ratio of counter anions is decreased, so that colloid tends to be generated and the refractive index is also decreased and hence such is undesirable. Also, at a molar ratio above 10 the aqueous titanium-tin basic salt solution can be prepared but such a molar ratio is undesirable since the titanium oxide-tin oxide composite sol produced using it exhibits a decreased effect of inhibition of discoloration by ultraviolet rays. The total concentration of titanium-tin in the aqueous titanium-tin basic salt solution in the step (a) in terms of ($TiO_2+SnO_2$) is preferably 5 to 50% by weight. A total concentration below 5% by weight is possible, but it is poor in efficiency and uneconomical. It is also possible to exceed 50% by weight but such is undesirable since the viscosity becomes high and it becomes hard to stir, which makes the reaction uneven.

In the step (a), the reaction of titanium salt, metallic tin and aqueous hydrogen peroxide in an aqueous solution is performed at a temperature of 30 to 95° C., preferably 40 to 85° C. Since the reaction of aqueous hydrogen peroxide and metallic tin is an oxidation reaction, it becomes an exothermic reaction. Moreover, a decomposition reaction of hydrogen peroxide takes place simultaneously. Since this reaction is also an exothermic reaction, care must be taken for temperature control upon the reaction and cooling may be performed, if needed. The reaction temperature may be below 30° C. However, since it is an exothermic reaction, excessive cooling is required, so that the reaction takes a long time and hence such is uneconomical. In a boiling state at a reaction temperature of more than 95° C., coarse colloid particles are generated and hence it is undesirable.

The step (b) is a step in which the titanium-tin basic salt obtained in the step (a) is hydrolyzed to obtain a flocculate of titanium oxide-tin oxide composite colloid. In the step (b), the aqueous titanium-tin basic salt solution is prepared so that it has a total concentration ($TiO_2+SnO_2$) in terms of titanium oxide ($TiO_2$) and tin oxide ($SnO_2$) of 2 to 15% by weight. Although a total concentration of below 2% by weight is possible, but it is poor in efficiency and uneconomical. It is also possible to exceed 15% by weight but such is undesirable since the viscosity becomes high and it becomes hard to stir, which makes the hydrolysis reaction uneven. Also, it is possible to add a basic substance in advance to adjust pH in order to control the particle size before the hydrolysis reaction can be performed. The above-mentioned basic substance includes, for example, sodium hydroxide, potassium hydroxide, ammonia, and alkylamines such as ethylamine, n-propylamine and isopropylamine, alkanolamines such as triethanolamine, and quaternary ammonium hydroxides, etc. and it is preferred to adjust pH to 1 to 2.

In the step (b), the temperature of the hydrolysis reaction is preferably a temperature of 50 to 100° C. It may be below 50° C. but such a temperature is undesirable since the hydrolysis reaction takes a long time. The hydrolysis reaction may be performed at above 100° C. but such a temperature is undesirable since a special hydrothermal treatment apparatus such as autoclave is needed and the secondary flocculate of colloid generated by the hydrothermal treatment becomes firm and stable to decrease the transparency of the resultant titanium oxide-tin oxide composite sol.

In the step (b), the time required for hydrolysis is preferably 0.1 to 100 hours. A time shorter than 0.1 hour is undesirable since the hydrolysis is insufficient. Also, if the time exceeds 100 hours, the primary particle size is too large and firm and stable secondary flocculate is formed and hence such is undesirable. The titanium oxide-tin oxide composite colloid particles obtained in the step (b) has a primary particle size of 2 to 20 nm (nanometers).

The step (c) is a step in which excessive electrolytes (mainly anions) are removed from the flocculate slurry of titanium oxide-tin oxide composite colloid obtained in the step (b) to peptize the titanium oxide-tin oxide composite colloid particles to obtain a sol. Removal of excessive electrolytes makes it possible to obtain a sol in which the titanium oxide-tin oxide composite colloid particles are dispersed in a state close to primary particles. The washing is performed by a method in which the particles are flocculated and sedimented and the supernatant is decanted, an ultrafiltration method, an ion exchange method or the like. In the case where a large amount of electrolytes is contained, a washing method by repeating ultrafiltration→water-pouring→ultrafiltration is particularly preferred.

After the step (c), an aqueous titanium oxide-tin oxide composite sol is obtained. The titanium oxide-tin oxide composite colloid particles in the sol obtained in the step (c) have a primary particle size of 2 to 20 nm. The primary particle size is not the size of titanium oxide-tin oxide composite colloid particles in the form of flocculate, but it is the size of a single titanium oxide-tin oxide composite colloid particle when separated into individual particles and it can be measured using an electron microscope. If the primary particle size is below 2 nm, the resulting titanium oxide-tin oxide composite sol has an increase viscosity and a decreased water resistance, so that it is undesirable. If the primary particle size is more than 20 nm, the resulting titanium oxide-tin oxide composite sol has a decreased transparency and is undesirable.

The titanium salt used in the step (a') of the second invention of the present application includes titanium tetrachloride, titanium sulfate, titanium nitrate, etc. These titanium salts are used preferably as aqueous solutions.

The zirconium oxysalt used in the step (a') includes zirconium oxy inorganic acid salt such as zirconium oxychloride, zirconium oxysulfate, zirconium oxynitrate or zirconium oxycarbonate, or zirconium oxy organic acid such as zirconium oxyacetate.

The metallic tin used in the step (a') may be used in the form of powder or granules. For example, use may be made of metallic tin powder obtained by an atomization method in which an ingot is molten, sprayed and solidified, and flake-like metallic tin powder is produced by cutting an ingot using a lathe or a rasp.

The hydrogen peroxide may be a commercially available 35% by weight aqueous solution, which is used at any desired concentration.

The step (a') is a step in which aqueous hydrogen peroxide and metallic tin are added to a mixed aqueous solution of titanium salt and zirconium oxysalt simultaneously or alternately to obtain an aqueous titanium-zirconium-tin basic salt solution. In a reactor equipped with a stirrer is charged a mixed aqueous solution of titanium salt and zirconium oxysalt, to which aqueous hydrogen peroxide and metallic tin are added through separate inlets simultaneously or alternately with stirring. The above-mentioned mixed aqueous solution can be obtained by a method in which a titanium salt and a zirconium oxysalt are dissolved in pure water, a method in which an aqueous titanium salt solution and an aqueous zirconium oxysalt solution are mixed, a method in which an zirconium oxysalt is added to an aqueous titanium salt solution, or a method in which a titanium salt is added to an aqueous zirconium oxysalt solution. Since the aqueous basic salt solution in the step (a') and a slurry containing the titanium oxide-zirconium oxide-tin oxide composite colloid flocculate in the subsequent step (b') is acidic, it is preferred that the reactors used in the steps are a glass reaction apparatus or a glass lined (enameled) reaction apparatus.

The aqueous hydrogen peroxide and the metallic tin are added to the mixed aqueous solution of titanium salt and zirconium oxysalt while retaining the $H_2O_2/Sn$ molar ratio of at 2 to 3. More particularly, it is raised a portionwise addition method in which a series of steps of collecting a 1/3 to 1/30 part by weight portion based on total parts by weight of each of the aqueous hydrogen peroxide and the metallic tin to be added, adding the hydrogen peroxide to the mixed aqueous solution of titanium salt and zirconium oxysalt, subsequently adding the metallic tin thereto, and performing reaction for 2 to 20 minutes are repeated 3 to 30 times. It is also raised a portionwise addition method in which a series of steps of collecting a 1/3 to 1/30 part by weight portion based on total parts by weight of each of the aqueous hydrogen peroxide and the metallic tin to be added, adding the metallic tin to the mixed aqueous solution of titanium salt and zirconium oxysalt, subsequently adding the hydrogen peroxide thereto, and performing reaction for 2 to 20 minutes are repeated 3 to 30 times.

In this case, if the total amount of the hydrogen peroxide is added to the acidic mixed aqueous solution of titanium salt and zirconium oxysalt in one time and then the metallic tin is added thereto, most part of hydrogen peroxide is decomposed in an initial stage of the reaction, so that the amount of hydrogen peroxide is deficient, and the decomposition reaction of hydrogen peroxide is an exothermic reaction and hence such is dangerous and undesirable. The reaction is possible at a $H_2O_2/Sn$ molar ratio of a little above 3. However, if the $H_2O_2/Sn$ molar ratio is greatly above 3, it is undesirable from the above-mentioned reasons. A $H_2O_2/Sn$ molar ratio of below 2 results in insufficient oxidation and hence such is undesirable. As for the time of addition, for example, the aqueous hydrogen peroxide and metallic tin may be added over 0.4 to 10 hours, preferable 0.4 to 5 hours, when a mixed aqueous solution in which 1 mol in the total mols of titanium salt and zirconium oxysalt is dissolved is used. If the time of addition is less than 0.4 hour, the exothermic reaction is too vigorous to be controlled and unreacted metallic tin tends to remain and hence such is undesirable. Moreover, it may be more than 10 hours, but such is uneconomical and hence it is undesirable.

The titanium-zirconium-tin basic salt generated in the step (a') may contain a titanium component, a zirconium component and a tin component in terms of titanium oxide ($TiO_2$), zirconium oxide ($ZrO_2$) and tin oxide ($SnO_2$) in a $ZrO_2/TiO_2$ molar ratio of 0.05 to 1.0, preferably 0.1 to 0.5, and in a $TiO_2/(ZrO_2+SnO_2)$ molar ratio of 0.25 to 10, preferably 0.4 to 4.0.

If this molar ratio is below 0.25, the aqueous titanium-zirconium-tin basic salt solution can be prepared but the molar ratio of counter anions is decreased, so that colloid tends to be generated and the refractive index is also decreased and hence such is undesirable. Also, at a molar ratio above 10 the aqueous titanium-zirconium-tin basic salt solution can be prepared but such a molar ratio is undesirable since the titanium oxide-zirconium oxide-tin oxide composite sol produced using it exhibits a decreased effect of inhibition of discoloration by ultraviolet rays. The total concentration in the aqueous titanium-zirconium-tin basic salt solution in the step (a') in terms of ($TiO_2+ZrO_2+SnO_2$) is preferably 5 to 50% by weight. A total concentration below 5% by weight is possible, but is poor in efficiency and uneconomical. It is also possible to exceed 50% by weight but such is undesirable since the viscosity becomes high and it becomes hard to stir, which makes the reaction uneven.

In the step (a'), the reaction of titanium salt, zirconium salt, metallic tin and aqueous hydrogen peroxide in an aqueous solution is performed at a temperature of 30 to 95° C., preferably 40 to 85° C. Since the reaction of aqueous hydrogen peroxide and metallic tin is an oxidation reaction, it becomes an exothermic reaction. However, a decomposition reaction of hydrogen peroxide takes place simultaneously. Since this reaction is also an exothermic reaction, care must be taken for temperature control upon the reaction and cooling may be performed, if needed. The reaction temperature may be below 30° C. but since it is an exothermic reaction excessive cooling is required, so that the reaction takes a long time and hence such is uneconomical. In a boiling state at a reaction temperature of more than 95° C., coarse colloid particles are generated in the step (a') and hence it is undesirable.

The step (b') is a step in which the titanium-zirconium-tin basic salt obtained in the step (a') is hydrolyzed to obtain flocculate of titanium oxide-zirconium oxide-tin oxide composite colloid. In the step (b'), it is preferable to prepare the aqueous titanium-zirconium-tin basic salt solution to have a total concentration ($TiO_2+ZrO_2+SnO_2$) in terms of titanium oxide ($TiO_2$), zirconium oxide ($ZrO_2$) and tin oxide ($SnO_2$) of 2 to 15% by weight. Although a total concentration of below 2% by weight is possible, but is poor in efficiency and uneconomical. It is also possible to exceed 15% by weight, but such is undesirable since the viscosity becomes high and it becomes hard to stir, which makes the hydrolysis reaction uneven. Also, it is possible to add a basic substance in advance to adjust pH in order to control the particle size before the hydrolysis reaction can be performed. The above-mentioned basic substance includes, for example, sodium hydroxide, potassium hydroxide, ammonia, and alkylamines such as ethylamine, n-propylamine and isopropylamine, alkanolamines such as triethanolamine, and quaternary ammonium hydroxides, etc. and it is preferred to adjust pH to 1 to 2.

In the step (b'), the temperature of the hydrolysis reaction is preferably a temperature of 50 to 100° C. It may be below 50° C. but such a temperature is undesirable since the hydrolysis reaction takes a long time. The hydrolysis reaction may be performed at above 100° C. but such a temperature is undesirable since a special hydrothermal treatment apparatus such as autoclave is needed and the secondary flocculate of colloid generated by the hydrothermal treatment becomes firm and stable to decrease the transparency of the resultant titanium oxide-zirconium oxide-tin oxide composite sol.

In the step (b'), the time required for hydrolysis is preferably 0.1 to 100 hours. A time shorter than 0.1 hour is undesirable since the hydrolysis is insufficient. Also, if the time exceeds 100 hours, the primary particle size is too large, and firm and stable secondary flocculates are formed and hence such is undesirable. The titanium oxide-zirconium oxide-tin oxide composite colloid particles obtained in the step (b') has a primary particle size of 2 to 20 nm (nanometers).

The step (c') is a step in which excessive electrolytes (mainly anions) are removed from the flocculate slurry of titanium oxide-zirconium oxide-tin oxide composite colloid obtained in the step (b') to peptize the titanium oxide-zirconium oxide-tin oxide composite colloid particles to obtain a sol. Removal of excessive electrolytes makes it possible to obtain a sol in which the titanium oxide-zirconium oxide-tin oxide composite colloid particles are dispersed in a state close to primary particles. The washing is performed by a method in which the particles are flocculated and sedimented and the supernatant is decanted, an ultrafiltration method, an ion exchange method or the like. In the case where a large amount of electrolytes is contained, a washing method by repeating ultrafiltration→water-pouring→ultrafiltration is particularly preferred.

After the step (c'), an aqueous titanium oxide-zirconium oxide-tin oxide composite sol is obtained. The titanium oxide-zirconium oxide-tin oxide composite colloid particles in the sol obtained in the step (c') have a primary particle size of 2 to 20 nm. The primary particle size is not the size of titanium oxide-zirconium oxide-tin oxide composite colloid particles in the form of flocculate, but is the size of a single titanium oxide-zirconium oxide-tin oxide composite colloid particle when separated into individual particles and it can be measured using an electron microscope. If the primary particle size is below 2 nm, the resulting titanium oxide-zirconium oxide-tin oxide composite sol has an increase viscosity and a decreased water resistance, so that is undesirable. If the primary particle size is more than 20 nm, the resulting titanium oxide-zirconium oxide-tin oxide composite sol has a decreased transparency and therefore, it is undesirable.

The titanium salt used in the step (a") of the third invention of the present application includes titanium tetrachloride, titanium sulfate, titanium nitrate, etc. These titanium salts are used preferably as aqueous solutions.

The cerium salt used in the step (a") includes cerium inorganic acid such as cerium chloride, cerium sulfate, cerium nitrate and cerium carbonate, cerium organic acid such as cerium acetate, or cerium hydroxide.

The metallic tin used in the step (a") may be used in the form of powder or granules. For example, use may be made of metallic tin powder obtained by an atomization method in which an ingot is molten, sprayed and solidified, and flake-like metallic tin powder is produced by cutting an ingot using a lathe or a rasp.

The hydrogen peroxide may be a commercially available 35% by weight aqueous solution, which is used at any desired concentration.

The step (a") is a step in which aqueous hydrogen peroxide and metallic tin are added to a mixed aqueous solution of titanium salt and cerium salt simultaneously or alternately to obtain an aqueous titanium-cerium-tin basic salt solution. In a reactor equipped with a stirrer is charged a mixed aqueous solution of titanium salt and cerium salt, to which aqueous hydrogen peroxide and metallic tin are added through separate inlets simultaneously or alternately with stirring. The above-mentioned mixed aqueous solution can be obtained by a method in which a titanium salt and a cerium salt are dissolved in pure water, a method in which an aqueous titanium salt solution and an aqueous cerium salt solution are mixed, a method in which a cerium salt is added to an aqueous titanium salt solution, or a method in which a titanium salt is added to an aqueous cerium salt solution. Since the aqueous basic salt solution in the step (a") and a slurry containing the titanium oxide-cerium oxide-tin oxide composite colloid flocculate in the subsequent step (b") is acidic, it is preferred that the reactors used in the steps are a glass reaction apparatus or a glass lined (enameled) reaction apparatus.

The aqueous hydrogen peroxide and the metallic tin are added to the mixed aqueous solution of titanium salt and cerium salt while retaining the $H_2O_2/Sn$ molar ratio of at 2 to 3. More particularly, it is raised a portionwise addition method in which a series of steps of collecting a 1/3 to 1/30 part by weight portion based on total parts by weight of each of the aqueous hydrogen peroxide and the metallic tin to be added, adding the hydrogen peroxide to the mixed aqueous solution of titanium salt and cerium salt, subsequently adding the metallic tin thereto, and performing reaction for 2 to 20 minutes are repeated 3 to 30 times. It is also raised a portionwise addition method in which a series of steps of collecting a 1/3 to 1/30 part by weight portion based on total parts by weight of each of the aqueous hydrogen peroxide and the metallic tin to be added, adding the metallic tin to the mixed aqueous solution of titanium salt and cerium salt, subsequently adding the hydrogen peroxide thereto, and performing reaction for 2 to 20 minutes are repeated 3 to 30 times.

In this case, if the total amount of the hydrogen peroxide is added to the acidic mixed aqueous solution of titanium salt and cerium salt in one time and then the metallic tin is added thereto, most part of hydrogen peroxide is decomposed in an initial stage of the reaction, so that the amount of hydrogen peroxide is deficient and the decomposition reaction of hydrogen peroxide is an exothermic reaction and hence such is dangerous and undesirable. The reaction is possible at a $H_2O_2/Sn$ molar ratio of a little above 3. However, if the $H_2O_2/Sn$ molar ratio is greatly above 3, it is undesirable from the above-mentioned reasons. A $H_2O_2/Sn$ molar ratio of below 2 results in insufficient oxidation and hence it is undesirable. As for the time of addition, for example, the aqueous hydrogen peroxide and metallic tin may be added over 0.4 to 10 hours, preferably 0.4 to 5 hours, when a mixed aqueous solution in which 1 mol in the total mols of titanium salt and cerium salt is dissolved is used. If the time of addition is less than 0.4 hour, the exothermic reaction is too vigorous to be controlled and unreacted metallic tin tends to remain and hence it is undesirable. Also, it may be more than 10 hours, but such is uneconomical and hence it is undesirable.

The titanium-cerium-tin basic salt generated in the step (a") may contain a titanium component, a cerium component and a tin component in terms of titanium oxide ($TiO_2$), cerium oxide ($CeO_2$) and Tin oxide ($SnO_2$) in a $CeO_2/TiO_2$ molar ratio of 0.01 to 0.5, preferably 0.05 to 0.5, and in a $TiO_2/(CeO_2+SnO_2)$ molar ratio of 0.25 to 10, preferably 0.4 to 4.0.

If this molar ratio is below 0.25, the aqueous titanium-cerium-tin basic salt solution can be prepared, but the molar ratio of counter anions is decreased, so that colloid tends to be generated and the refractive index is also decreased and hence such is undesirable. Also, at a molar ratio above 10 the aqueous titanium-cerium-tin basic salt solution can be prepared but such a molar ratio is undesirable since the titanium oxide-cerium oxide-tin oxide composite sol produced using it exhibits a decreased effect of inhibition of discoloration by ultraviolet rays. The total concentration of the aqueous titanium-cerium-tin basic salt solution in the step (a') in terms of ($TiO_2+CeO_2+SnO_2$) is preferably 5 to 50% by weight. A total concentration below 5% by weight is possible but is poor in efficiency and uneconomical. It is also possible to exceed 50% by weight but such is undesirable since the viscosity becomes high and it becomes hard to stir, which makes the reaction uneven.

In the step (a"), the reaction of titanium salt, cerium salt, metallic tin and aqueous hydrogen peroxide in an aqueous medium is performed at a temperature of 30 to 95° C., preferably 40 to 85° C. Since the reaction of aqueous hydrogen peroxide and metallic tin is an oxidation reaction, it becomes an exothermic reaction. Moreover, a decomposition reaction of hydrogen peroxide takes place simultaneously. Since this reaction is also an exothermic reaction, care must be taken for temperature control upon the reaction and cooling may be performed, if needed. The reaction temperature may be below 30° C. However, since it is an exothermic reaction excessive, cooling is required, so that the reaction takes a long time and hence such is uneconomical. In a boiling state at a reaction temperature of more than 95° C., coarse colloid particles are generated in the step (a") and hence such is undesirable.

The step (b") is a step in which the titanium-cerium-tin basic salt obtained in the step (a") is hydrolyzed to obtain a flocculate of titanium oxide-cerium oxide-tin oxide composite colloid. In the step (b"), it is preferable to prepare the aqueous titanium-cerium-tin basic salt solution to have a total concentration ($TiO_2+CeO_2+SnO_2$) in terms of titanium oxide ($TiO_2$), cerium oxide ($CeO_2$) and tin oxide ($SnO_2$) of 2 to 15% by weight. Although a total concentration of below 2% by weight is possible, but it is poor in efficiency and uneconomical. It is also possible to exceed 15% by weight, but it is undesirable since the viscosity becomes high and it becomes hard to stir, which makes the hydrolysis reaction uneven. Also, it is possible to add a basic substance in advance to adjust pH in order to control the particle size before the hydrolysis reaction can be performed. The above-mentioned basic substance includes, for example, sodium hydroxide, potassium hydroxide, ammonia, and alkylamines such as ethylamine, n-propylamine and isopropylamine, alkanolamines such as triethanolamine, and quaternary ammonium hydroxides, etc. and it is preferred to adjust pH to 1 to 2.

In the step (b"), the temperature of the hydrolysis reaction is preferably a temperature of 50 to 100° C. It may be below 50° C., but such a temperature is undesirable since the hydrolysis reaction takes a long time. The hydrolysis reaction may be performed at above 100° C., but such a temperature is undesirable since a special hydrothermal treatment apparatus such as autoclave is needed and the secondary flocculate of colloid generated by the hydrothermal treatment becomes firm and stable to decrease the transparency of the resultant titanium oxide-cerium oxide-tin oxide composite sol.

In the step (b"), the time required for hydrolysis is preferably 0.1 to 100 hours. A time shorter than 0.1 hour is undesirable since the hydrolysis is insufficient. Also, if the time exceeds 100 hours, the primary particle size is too large, and firm and stable secondary flocculates are formed and hence such is undesirable. The titanium oxide-cerium oxide-tin oxide composite colloid particles obtained in the step (b") has a primary particle size of 2 to 20 nm (nanometers).

The step (c") is a step in which excessive electrolytes (mainly anions) are removed from the flocculate slurry of titanium oxide-cerium oxide-tin oxide composite colloid obtained in the step (b") to peptize the titanium oxide-cerium oxide-tin oxide composite colloid particles to obtain a sol. Removal of excessive electrolytes makes it possible to obtain a sol in which the titanium oxide-cerium oxide-tin oxide composite colloid particles are dispersed in a state close to primary particles. The washing is performed by a method in which the particles are flocculated and sedimented and the supernatant is decanted, an ultrafiltration method, an ion exchange method or the like. In the case where a large amount of electrolytes is contained, a washing method by repeating ultrafiltration→water-pouring→ultrafiltration is particularly preferred.

After the step (c"), an aqueous titanium oxide-cerium oxide-tin oxide composite sol is obtained. The titanium oxide-cerium oxide-tin oxide composite colloid particles in the sols obtained in the step (c") have a primary particle size of 2 to 20 nm. The primary particle size is not the size of titanium oxide-cerium oxide-tin oxide composite colloid particles in the form of flocculate but is the size of a single titanium oxide-cerium oxide-tin oxide composite colloid particle when separated into individual particles and it is measured using an electron microscope. If the primary particle size is below 2 nm, the resulting titanium oxide-cerium oxide-tin oxide composite sol has an increase viscosity and a decreased water resistance and is undesirable. If the primary particle size is more than 20 nm, the resulting titanium oxide-cerium oxide-tin oxide composite sol has a decreased transparency and is undesirable.

As the steps (d), (d') and (d"), a step of anion exchanging the composite sols obtained in the steps (c), (c') and (c"), respectively, may be added. By this anion exchange treatment, sols that are stable even in a high concentration can be obtained.

The anion exchange in the steps (d), (d') and (d") can be performed using commercially available anion exchange resins and the anion exchange resins are adjusted to hydroxyl group type before they can be used. Anion exchange is readily achieved by flowing the composite aqueous sol through a column packed with the anion exchange resin. Preferably, the flow temperature is 0 to 60° C. and the flow rate is a space velocity SV of 1 to 10 hours. In the steps (d), (d') and (d"), before and/or after the anion exchange treatment, a basic substance may be added to the composite aqueous sol to increase its stability. The basic substance used in the steps (d), (d') and (d") is preferably an organic base. For example, alkylamines such as ethylamine, n-propylamine and isopropylamine, alkanolamine such as triethanolamine, quaternary ammonium hydroxide, etc. can be used.

The alkaline composite sols obtained in the steps (d), (d') and (d") are stable as they are, but they may be concentrated by an ultrafiltration method or an evaporation method, if needed, to obtain a sol that is of high concentration and stable.

As the steps (e), (e') and (e"), a step of substituting an organic solvent for the aqueous medium of the composite sol obtained in the steps (c), (c') and (c") or the steps (d), (d') and (d"), respectively, may be added.

Upon the solvent substitution in the steps (e), (e') and (e"), addition of a small amount of an organic base and/or organic acid, etc. as a stabilizing agent makes it possible to perform the solvent substitution stably. The organic base includes, for example, alkylamines such as ethylamine, n-propylamine and isopropylamine, alkanolamine such as triethanolamine, quaternary ammonium hydroxide, etc. The organic acid includes, for example, hydroxycarboxylic acids such as glycolic acid, tartaric acid, malic acid and citric acid and phenylphosphonic acid, etc. The solvent substitution can be performed by a commonly used method such as a distillation method, an ultrafiltration method or the like. The organic solvent includes lower alcohols such as methanol, ethanol, and isopropanol; straight chain amides such as dimethylformamide and N,N-dimethylacetamide; cyclic amides such as N-methyl-2-pyrrolidone; glycol ethers such as ethyl cellosolve; and ethylene glycol, etc.

The titanium oxide-tin oxide composite colloid particles in the sols obtained through the steps (d), (d') and (d") and the steps (e), (e') and (e") likewise have a primary particle size of 2 to 20 nm.

Since titanium oxide ($TiO_2$) has an ability of absorbing ultraviolet rays, it is used in various plastics, fibers and the like as an ultraviolet resistant pigment or filler by addition of powder having a particle size on the order of 0.1 to 10 μm. Also, titanium oxide used in optics related applications, for example, titanium oxide used as a microfiller in a coating composition coated on optical elements or transparent films is used as a sol having a primary particle size of 100 nm or less, preferably 20 nm or less. Titanium oxide having a small primary particle size is very sensitive to ultraviolet rays to increase the effect of absorbing ultraviolet rays but on the contrary, the titanium oxide has the defect that it is partially reduced from $TiO_2$ to TiO, thereby coloring to deep blue. Stannic oxide ($SnO_2$) has such a defect that when it is in the form of a sol having a primary particle size is 100 nm or less, in particular 30 nm or less, there occurs a partial reduction reaction of from $SnO_2$ to SnO by ultraviolet rays, thereby coloring to brown or bluish green.

With regards to the composite sols of the first, second and third inventions of the present application, the aqueous hydrogen peroxide and the metallic tin are added in advance to the aqueous titanium salt solution or the aqueous solution of titanium salt and zirconium oxysalt or cerium salt while retaining the $H_2O_2/Sn$ molar ratio in the range of 2 to 3 to cause a reaction to form an aqueous solution of titanium-tin basic salt, an aqueous solution of titanium-zirconium-tin basic salt, or an aqueous solution of titanium-cerium-tin basic salt and they are hydrolyzed to form an aqueous solution of titanium oxide-tin oxide composite colloid, an aqueous solution of titanium oxide-zirconium oxide-tin oxide composite colloid, or an aqueous solution of titanium oxide-cerium oxide-tin oxide composite colloid. Therefore, the following bondings:

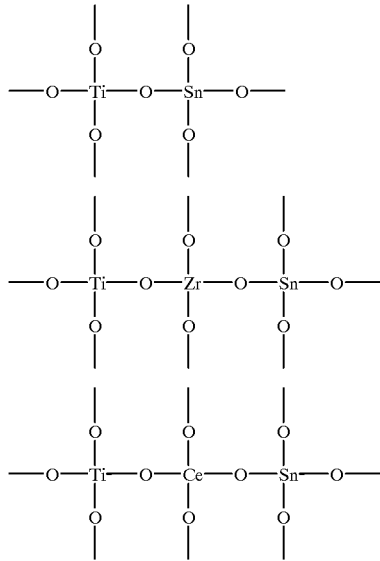

are considered to be formed, so that the reduction to TiO or SnO by the irradiation of ultraviolet rays is remarkably inhibited, causing substantially no discoloration, as compared with the case where the individual oxides are included or a mixture of the individual oxides is included.

Also, the sols produced by the present invention will not separate into $TiO_2$ particles and $SnO_2$ particles even after the operations of removal of electrolytes, ion exchange, solvent substitution in the steps (c), (c") and (e'''), the steps (d), (d") and (d''') and the steps (e), (e") and (e'''), so that it is considered that following bondings

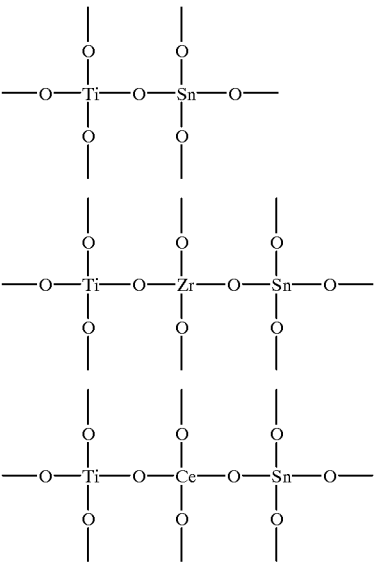

are formed at an atomic level.

Also, since the composite sols of the first, second and third inventions of the present application are made uniformly composite (forming solid solutions) at an atomic level, it can decrease sintering temperature and impart more uniform material properties of titanium oxide-tin oxide, titanium oxide-zirconium oxide-tin oxide, and titanium oxide-cerium, oxide-tin oxide materials when used as a material for various ceramics.

In the fourth invention of the present application, the formula (I)

$$(R^1)_a(R^3)_b Si(OR^2)_{4-(a+b)} \qquad (I)$$

in the component (A) used in the coating composition includes those organosilicon compounds in which $R^1$ and $R^3$ are the same organic group or different organic groups respectively, or those in which a and b are the same integer or different integers, respectively. The organosilicon compounds of the formula (I) above in the above-mentioned component (A) include, for example, tetramethoxysilane, tetraethoxysilane, tetra-n-propoxysilane, tetraisopropoxysilane, tetra-n-butoxysilane, tetraacetoxysilane, methyltrimethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane,
α-glycidoxybutyltriethoxysilane,
β-glycidoxybutyltriethoxysilane,
γ-glycidoxybutyltrimethoxysilane,
γ-glycidoxybutyltriethoxysilane,
δ-glycidoxybutyltrimethoxysilane,
δ-glycidoxybutyltriethoxysilane, (3,4-epoxycyclohexyl) methyltrimethoxysilane, (3,4-epoxycyclohexyl) methyltriethoxysilane, β-(3,4-epoxycyclohexyl) ethyltrimethoxysilane, β-(3,4-epoxycyclohexyl) ethytriethoxysilane, β-(3,4-epoxycyclohexyl) ethyltripropoxysilane, β-(3,4-epoxycyclohexyl) ethyltributoxysilane, β-(3,4-epoxycyclohexyl) ethyltriphenoxysilane, γ-(3,4-epoxycyclohexyl) propyltrimethoxysilane, γ-(3,4-epoxycyclohexyl) propyltriethoxysilane, δ-(3,4-epoxycyclohexyl) butyltrimethoxysilane, δ-(3,4-epoxycyclohexyl) butyltriethoxysilane,
glycidoxymethylmethyldimethoxysilane,
glycidoxymethylmethyldiethoxysilane,
α-glycidoxyethylmethyldimethoxysilane,
α-glycidoxyethylmethyldiethoxysilane,
β-glycidoxyethylmethyldimethoxysilane,
β-glycidoxyethylethyldimethoxysilane,
α-glycidoxypropylmethyldimethoxysilane,
α-glycidoxypropylmethyldiethoxysilane,
β-glycidoxypropylmethyldimethoxysilane,
β-glycidoxypropylethyldimethoxysilane,
γ-glycidoxypropylmethyldimethoxysilane,
γ-glycidoxypropylmethyldiethoxysilane,
γ-glycidoxypropylmethyldipropoxysilane,
γ-glycidoxypropylmethyldibutoxysilane,
γ-glycidoxypropylmethyldiphenoxysilane,
γ-glycidoxypropylethyldimethoxysilane,
γ-glycidoxypropylethyldiethoxysilane,
γ-glycidoxypropylvinyldimethoxysilane,
γ-glycidoxypropylvinyldiethoxysilane,
ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane,
γ-chloropropyltrimethoxysilane,
γ-chloropropyltriethoxysilane,
γ-chloropropyltriacetoxysilane, 3,3,3-trifluoropropyltrimethoxysilane,
γ-methacryloxypropyltrimethoxysilane,
γ-mercaptopropyltrimethoxysilane,
γ-mercaptopropyltriethoxysilane,
β-cyanoethyltriethoxysilane, chloromethyltrimethoxysilane, chloromethyltriethoxysilane, N-(β-aminoethyl)γ-aminopropyltrimethoxysilane, N-(β-aminoethyl)γ-aminopropylmethyldimethoxysilane,
γ-aminopropylmethyldimethoxysilane, N-(β-aminoethyl)γ-aminopropyltriethoxysilane, N-(β-aminoethyl)γ-aminopropylmethyldiethoxysilane,
dimethyldimethoxysilane, phenylmethyldimethoxysilane, dimethyldiethoxysilane, phenylmethyldiethoxysilane,
γ-chloropropylmethyldimethoxysilane,
γ-chloropropylmethyldiethoxysilane,
dimethyldiacetoxysilane,
γ-methacryloxypropylmethyldimethoxysilane,
γ-methacryloxypropylmethyldiethoxysilane,
γ-mercaptopropylmethyldimethoxysilane,
γ-mercaptomethyldiethoxysilane,
methylvinyldimethoxysilane, methylvinyldiethoxysilane, etc. These can be used singly or two or more of them can be used in combination.

Also, the hydrolysates of the organosilicon compound of the formula (I) in the component (A) used in the coating composition of the present invention are converted into the compounds in which the above-mentioned $R^2$ is partly or entirely replaced by a hydrogen atom by hydrolysis of the organosilicon compound of the formula (I) above. The hydrolysates of the organosilicon compound of the formula (I) may be used singly or two or more of them may be used in combination. The hydrolysis can be carried out by adding an acidic aqueous solution such as an aqueous hydrochloric acid solution, an aqueous sulfuric acid solution, an aqueous acetic acid solution, etc. to the above-mentioned organosilicon compound and stirring the mixture.

The organosilicon compound of the formula (II)

$$[(R^4)_cSi(OX)_{3-c}]_2Y \qquad (II)$$

in the component (A) used in the coating composition of the present invention includes, for example, methylenebismethyldimethoxysilane, ethylenebisethyldimethoxysilane, propylenebisethyldiethoxysilane, butylenebismethyldiethoxysilane, etc. They can be used singly or two or more of them may be used in combination.

Also, the hydrolysates of the organosilicon compound of the formula (II) in the component (A) used in the coating composition of the present invention are converted into the compounds in which the above-mentioned X is partly or entirely replaced by a hydrogen atom by hydrolysis of the organosilicon compound of the formula (II) above. The hydrolysates of the organosilicon compound of the formula (II) may be used singly or two or more of them may be used in combination. The hydrolysis can be carried out by adding an acidic aqueous solution such as an aqueous hydrochloric acid solution, an aqueous sulfuric acid solution, an aqueous acetic acid solution, etc. to the above-mentioned organosilicon compound and stirring the mixture.

The component (A) used in the coating composition of the present invention is at least one silicon-containing substance selected from the group consisting of the organosilicon compounds of the formula (I) and (II) and hydrolysates thereof.

The component (A) used in the coating composition of the present invention is preferably at least one silicon-containing substance selected from the group consisting of the organosilicon compounds represented by the general formula (I) and hydrolysates thereof. In particular, the organosilicon compounds represented by the formula (I) in which one of $R^1$ and $R^3$ is an organic group having an epoxy group, $R^2$ is a and b are independently 0 or 1, provided that a+b is 1 or 2 and hydrolysates thereof are preferred and examples of the preferred organosilicon compounds include glycidoxymethyltrimethoxysilane,
glycidoxymethyltriethoxysilane,
α-glycidoxyethyltrimethoxysilane,
α-glycidoxyethyltriethoxysilane,
β-glycidoxyethyltrimethoxysilane,
β-glycidoxyethyltriethoxysilane,
α-glycidoxypropyltrimethoxysilane,
α-glycidoxypropyltriethoxysilane,
β-glycidoxypropyltrimethoxysilane,
β-glycidoxypropyltriethoxysilane,
γ-glycidoxypropyltrimethoxysilane,
γ-glycidoxypropyltriethoxysilane,
γ-glycidoxypropyltripropoxysilane,
γ-glycidoxypropyltributoxysilane,
γ-glycidoxypropyltriphenoxysilane, α-glycidoxybutyltrimethoxysilane,
α-glycidoxybutyltriethoxysilane,
β-glycidoxybutyltriethoxysilane,
γ-glycidoxybutyltrimethoxysilane,
γ-glycidoxybutyltriethoxysilane,
δ-glycidoxybutyltrimethoxysilane,
δ-glycidoxybutyltriethoxysilane,
glycidoxymethylmethyldimethoxysilane,
glycidoxymethylmethyldiethoxysilane,
α-glycidoxyethylmethyldimethoxysilane,
α-glycidoxyethylmethyldiethoxysilane,
β-glycidoxyethylmethyldimethoxysilane,
β-glycidoxyethylethyldimethoxysilane,
α-glycidoxypropylmethyldimethoxysilane,
α-glycidoxypropylmethyldiethoxysilane,
β-glycidoxypropylmethyldimethoxysilane,
β-glycidoxypropylethyldimethoxysilane,
γ-glycidoxypropylmethyldimethoxysilane,
γ-glycidoxypropylmethyldiethoxysilane,
γ-glycidoxypropylmethyldipropoxysilane,
γ-glycidoxypropylmethyldi.rooxysilane,
γ-glycidoxypropylmethyldibutoxysilane,
γ-glycidoxypropylmethyldiphenoxysilane,
γ-glycidoxypropylethyldiethoxysilane,
γ-glycidoxypropylethyldimethoxysilane,
γ-glycidoxypropylethyldimethoxysilane, an
γ-glycidoxypropylvinyldiethoxysilane.

Further, preferred examples include γ-glycidoxypropyltrimethoxysilane, γ-glycidoxypropylmethyldiethoxysilane, γ-glycidoxypropylmethyldimethoxysilane, and hydrolysates thereof. They can be used singly or as mixtures. Also, γ-glycidoxypropyltrimethoxysilane, γ-glycidoxypropylmethyldiethoxysilane, γ-glycidoxypropylmethyldimethoxysilane or hydrolysates thereof may be used further in combination with tetrafunctional compounds corresponding to compounds of the formula (I) in which a+b=0. Examples of the compounds corresponding to the tetrafunctional compound include tetramethoxysilane, tetraethoxysilane, tetraisopropoxysilane, tetra-n-propoxysilane, tetra-n-butoxysilane, tetra-tert-butoxysilane, tetra-sec-butoxysilane, etc.

The component (B) used in the coating composition of the fourth invention of the present application comprises titanium oxide-tin oxide composite colloid particle having a primary particle size of 2 to 20 nm.

The titanium oxide-tin oxide composite colloid particles are preferably used as a sol of titanium oxide-tin oxide composite colloid particles dispersed in a liquid medium. The liquid medium in which the titanium oxide-tin oxide composite colloid particles are dispersed in preferably includes aqueous medium, hydrophilic organic solvents such as methanol, ethanol, isopropanol, etc. The titanium oxide-tin oxide composite colloid particles have a primary particle size of 2 to 20 nm (nanometers).

The sol containing the titanium oxide-tin oxide composite colloid particles used in the present invention may be one that is produced by any method. The sol containing the titanium oxide-tin oxide composite colloid particles is preferably the one that is produced by the method according to the first invention of the present application.

In the coating composition of the fifth invention of the present application, the component (A) may be those used in the fourth invention of the present application. Also, the component (B') comprises titanium oxide-zirconium oxide-tin oxide composite colloid particles having a primary particle size of 2 to 20 nm.

The above-mentioned titanium oxide-zirconium oxide-tin oxide composite colloid particles preferably used as a sol of titanium oxide-zirconium oxide-tin oxide composite colloid particles dispersed in a liquid medium. The liquid medium that the titanium oxide-zirconium oxide-tin oxide composite colloid particles are dispersed in preferably includes aqueous medium, hydrophilic organic solvents such as methanol, ethanol, isopropanol, etc. The titanium oxide-zirconium oxide-tin oxide composite colloid particles have a primary particle size of 2 to 20 nm (nanometers).

The sol containing the titanium oxide-zirconium oxide-tin oxide composite colloid particles for use in the component (B') of the fifth invention of the present application may be one that is produced by any method. The sol containing the titanium oxide-zirconium oxide-tin oxide composite colloid particles is preferably the one that is produced by the method according to the second invention of the present application.

In the coating composition of the sixth invention of the present application, the component (A) may be those used in the fourth invention of the present application. Also, the component (B") comprises titanium oxide-cerium oxide-tin oxide composite colloid particles having a primary particle size of 2 to 20 nm.

The above-mentioned titanium oxide-cerium oxide-tin oxide composite colloid particles preferably used as a sol of titanium oxide-cerium oxide-tin oxide composite colloid particles dispersed in a liquid medium. The liquid medium in which the titanium oxide-cerium oxide-tin oxide composite colloid particles are dispersed in preferably includes aqueous medium, hydrophilic organic solvents such as methanol, ethanol, isopropanol, etc. The titanium oxide-cerium oxide-tin oxide composite colloid particles have a primary particle size of 2 to 20 nm (nanometers).

The sol containing the titanium oxide-cerium oxide-tin oxide composite colloid particles for use in the component (B") of the sixth invention of the present application may be one that is produced by any method. The sol containing the titanium oxide-cerium oxide-tin oxide composite colloid particles is preferably the one that is produced by the method according to the third invention of the present application.

The components (C), (C') and (C") in the coating compositions of the fourth, fifth and sixth inventions of the present application may contain at least one metal compound selected from the group consisting of metal salts, metal alkoxides and metal chelates as a curing catalyst. The addition of the components (C), (C') and (C") promotes curing reaction when the coating composition of the present invention is coated on the surface of an optical element so that sufficiently cured films can be obtained in a short time.

The above-mentioned components (C), (C') and (C") include alkali metal salts, alkaline earth metal salts and polyvalent metal salts of organic carboxylic acids, chromic acid, hypochlorous acid, boric acid, perchloric acid, bromic acid, selenious acid, thiosulfuric acid, orthosilicic acid, thiocyanic acid, nitrous acid, aluminic acid, carbonic acid, etc., and further metal alkoxides having aluminum, zirconium or titanium and metal chelate compounds thereof. In particular, the components (C), (C') and (C") are preferably metal chelate compounds. The metal chelate compounds include acetylacetonato complexes, for example, aluminum acetylacetonate. The anion obtained by releasing one proton from the $CH_2$ group in acetylacetone $CH_3COCH_2COCH_3$ is an acetylacetonato ligand (abbreviation: acac) and aluminum acetylacetonate has the structure of $Al(acac)_3$.

Also, as the above-mentioned components (C), (C') and (C"), amines such as allylamine and ethylamine, or various acids and bases including Lewis acids or Lewis bases may be used.

The coating compositions of the fourth, fifth and sixth inventions of the present application may contain various kinds of surface-active agents so as to improve wettability at the time when the coating compositions are coated on the surface of an optical element and to improve smoothness of a film obtained by curing treatment. Moreover, ultraviolet-absorber and anti-oxidizing agent may be added unless they give any influence on the properties of the obtained film.

The coating compositions of the present invention may contain fine particulate metal oxides so as to conform to the refractive index of various optical elements, for example, lenses. The fine particulate metal oxides include aluminum oxide, titanium oxide, antimony oxide, zirconium oxide, silicon oxide, cerium oxide, etc.

The coating compositions of the fourth, fifth and sixth inventions of the present application may contain 1 to 500 parts by weight, preferably 100 to 300 parts by weight of the composite colloid particles as the components (B), (B') and (B") per 100 parts by weight of the silicon-containing substance as the component (A). With below 1 part by weight of the above-mentioned composite colloid particles, the resultant film have a decreased refractive index so that the range of its application to substrates is considerably limited. On the other hand, with above 500 parts by weight of the above-mentioned composite colloid particles, cracks tend to occur between the cured film and the substrate to further decrease the transparency and hence such is undesirable.

In the seventh, eighth and ninth inventions of the present application, optical elements that have cured films comprising the coating compositions obtained in the fourth, fifth and sixth inventions can be obtained. As the method for forming cured films comprising the coating compositions of the fourth, fifth and sixth inventions of the present application, respectively, on optical elements includes a method in which the above-described coating composition is coated on an optical element and then cured. As the coating means, there may be applied usually performed methods such as a dipping method, a spinning method, and a spraying method. However, in view of the surface smoothness of the resulting film, a dipping method and a spinning method are particularly preferred.

Further, before the above-described coating composition is coated on an optical element, the adhesion between the optical element and the cured film may be improved using chemical treatment by acids, alkalis, various organic solvents, physical treatment by plasma, ultraviolet rays, etc., detergent treatment with various detergents, and further primer treatment with various resins.

The coating compositions of the fourth, fifth and sixth inventions of the present application can be converted to a cured film by coating it on an optical element and then curing. The curing of the coating compositions of the fourth, fifth and sixth inventions of the present application can be performed by hot-air drying or irradiation of activate energy rays. When hot-air drying is used, it is performed in a hot air at 70 to 200° C., particularly preferably 90 to 150° C. Also, as the activate energy rays are used far infrared rays, which can reduce damages by heat.

In the seventh, eighth and ninth invention of the present application, there can be obtained optical elements having on the surface thereof a laminated film comprising a cured film of the above-mentioned coating composition and an antireflection film.

The antireflection film can be provided on the cured film of the coating composition according to the fourth, fifth and sixth inventions of the present application. The antireflection film is preferably a multilayer film and is obtained by alternately laminating a low refractive index film and a high refractive index film. The high refractive index film used in the antireflection film includes zirconium oxide vacuum evaporated film or a mixed vacuum evaporated film of zirconium oxide and a metal oxide containing tantalum oxide and yttrium oxide. The low refractive index film used in the antireflection film includes vacuum evaporated film of silica. The zirconium oxide vacuum evaporated film or the mixed vacuum evaporated film of zirconium oxide and a metal oxide containing tantalum oxide and yttrium oxide can be formed by vacuum-evaporating zirconium powder alone or a mixture of zirconium oxide powder and tantalum oxide powder and yttrium oxide powder which has been pelletized by pressure press or sintering by an electron beam heating method on a film of the coating composition of the present invention, thereby providing an antireflection film.

The cured film comprising the coating composition of the fourth, fifth and sixth inventions of the present invention has a high refractive index so that it can be used as an antireflection film by itself and further addition of functional component such as a clouding resistance, photochromic, stainproof or the like thereto enables one to use it as a multifunctional film.

The optical elements used in the seventh, eighth and ninth inventions of the present application are preferably transparent plastic molded parts. The transparent plastic includes, for example, lenses for glasses, lenses for cameras, automotive windowpanes, optical filters attached to liquid-crystal displays and plasma displays, etc.

The coating compositions of the fourth, fifth and sixth inventions of the present application contain at least one silicon-containing substance selected from the group consisting of organosilicon compounds of the formulae (I) and (II) and hydrolysates thereof as the component (A) and composite colloid particles as the components (B), (B') and (B"). The coating compositions of the present invention can be produced by hydrolyzing the organosilicon compound as the component (A) in an acidic aqueous solution and mixing the hydrolysate with an organosol containing composite colloid particles containing the components (B), (B') and (B"). The organosol containing the composite colloid particles which can be used are preferably sols of composite colloid particles dispersed in methanol solvent.

The above-mentioned coating compositions of the fourth, fifth and sixth inventions can be coated on an optical element and cured to give highly transparent good looking optical element that is excellent in marring resistance, surface hardness, wear resistance, transparency, heat resistance, light resistance, weather resistance and water resistance and exhibits no interference fringe when coated on a high refractive index element having a refractive index of 1.54 or more.

Hereafter, concrete examples are described in detail in the following examples. However, the present invention is not limited to the following examples.

EXAMPLES

Production Example 1
(Preparation of Titanium Oxide-tin Oxide Composite Sol)
Step (a): 587.5 g of titanium tetrachloride (27.2% by weight in terms of $TiO_2$, Cl being 32.0% by weight, manufactured by Sumitomo Citix Co., Ltd.) (159.8 g in terms of $TiO_2$) and 477.8 g of water were charged in a 3-liter jacketed glass separable flask to prepare 1065.3 g (concentration: 15.0% by weight in terms of $TiO_2$) of an aqueous titanium chloride solution.

The aqueous solution was warmed to 60° C. while stirring with a glass rod stirrer and then 486.0 g of 35% by weight-concentration aqueous hydrogen peroxide (for industrial use) and 237.4 g of metallic tin powder (manufactured by Yamaishi Kinzoku Co., Ltd., trade name: AT-Sn, No. 200) were added while cooling.

The addition of aqueous hydrogen peroxide and metallic tin was achieved by first adding 24.3 g (0.25 mol) of the aqueous hydrogen peroxide and then 11.87 g (0.1 mol) of the metallic tin gradually. After the reaction is completed (5 to 10 minutes), 24.3 g (0.25 mol) of the aqueous hydrogen peroxide and then 11.87 g (0.1 mol) of the metallic tin were added gradually. In this manner, the addition of the aqueous hydrogen peroxide and the following addition of the metallic tin were repeated 20 times at an interval of 5 to 10 minutes to effect portionwise addition of 24.3 g×20 times of the aqueous hydrogen peroxide and 11.87 g×20 times of the metallic tin.

Since the reaction is an exothermic reaction, the addition of the metallic tin elevated the temperature to 80 to 85° C. and after completion of the reaction, the temperature was lowered to 60 to 70° C. due to cooling. Therefore, during the addition, the reaction temperature was 60 to 85° C.

Upon the addition, the proportion of the hydrogen peroxide to the metallic tin was at a $H_2O_2$/Sn molar ratio of 2.5. The time required for addition of the aqueous hydrogen peroxide and the metallic tin was 2.5 hours. A suitable amount of water was replenished since water evaporates by the reaction. After completion of the reaction, 2258 g of a pale yellow, transparent aqueous solution of basic titanium-tin chloride composite salt was obtained. In the resulting aqueous solution of basic titanium-tin chloride composite salt, the titanium component was in a concentration of 7.08% by weight in terms of titanium oxide ($TiO_2$) and the tin component was in a concentration of 13.35% by weight in terms of tin oxide ($SnO_2$) and the molar ratio in terms of $TiO_2$/$SnO_2$ was 1.0. (Ti+Sn)/Cl molar ratio was 0.73.

Step (b): To 980.4 g of the aqueous solution of basic titanium-tin chloride composite salt obtained in the step (a) was added 3019.6 g of water to be diluted to a concentration of 5% by weight in terms of $TiO_2$+$SnO_2$. This aqueous solution was hydrolyzed at 95 to 98° C. for 12 hours to obtain a slurry of flocculate of titanium oxide-tin oxide composite colloid having a primary particle size of 4 to 8 nm.

Step (c): The slurry of flocculate of titanium oxide-tin oxide composite colloid obtained in the step (b) was treated by repeating the operations of concentration→water-pouring→concentration using about 8 liters of water in an ultrafiltration apparatus to wash and remove excessive electrolytes and then peptized to obtain 3624 g of an acidic titanium oxide-tin oxide composite aqueous sol. The primary particle size of the titanium oxide-tin oxide composite colloid particles measured using an electron microscope was 4 to 8 nm.

Step (d): After adding 6.0 g of isopropylamine to 3624 g of the acidic titanium oxide-tin oxide composite aqueous sol obtained in the step (c), the mixture was flown through a column packed with 200 ml of an anion exchange resin (Amberlite IRA-410, manufactured by Organo Co., Ltd.) to obtain 4696 g of an alkaline titanium oxide-tin oxide composite aqueous sol. The sol was concentrated under reduced pressure in a rotary evaporator to obtain 1820.8 g of a titanium oxide-tin oxide composite aqueous concentrated sol. The obtained sol had a specific gravity of 1.100, a viscosity of 16.3 mPa·s, a pH of 8.91, a conductivity of 1005 μs/cm, a concentration of 3.8% by weight in terms of $TiO_2$, and a concentration of 7.2% by weight in terms of $SnO_2$.

Step (e): After adding 12 g of tartaric acid and 18 g of diisopropylamine to 1877.1 g of the alkaline titanium oxide-tin oxide composite aqueous concentrated sol obtained in the step (d) with stirring, the aqueous medium was substituted by methanol by a method of distilling off the water by gradually adding 40 liters of methanol under reduced pressure in a rotary evaporator to prepare 915 g of a titanium oxide-tin oxide composite methanol sol. The obtained methanol sol had a specific gravity of 1.096, a primary particle size of titanium oxide-tin oxide composite colloid particle of 4 to 8 nm, a viscosity of 4.3 mPa·s, a pH (1+1) of 7.40, a conductivity (1+1) of 1405 μs/cm, a concentration of 10.6% by weight in terms of $TiO_2$, a concentration of 19.9% by weight in terms of $SnO_2$, and a water content of 0.44% by weight.

Production Example 2

(Preparation of Titanium Oxide-tin Oxide Composite Sol)

Step (a): 587.5 g of titanium tetrachloride (27.2% by weight in terms of $TiO_2$, Cl being 32.0% by weight, manufactured by Sumitomo Citix Co., Ltd.) (159.8 g in terms of $TiO_2$) and 744.2 g of water were charged in a 3-liter jacketed glass separable flask to prepare 1331.7 g (concentration: 12.0% by weight in terms of $TiO_2$) of an aqueous titanium chloride solution. The aqueous solution was warmed to 50° C. while stirring with a glass rod stirrer and then 797.0 g of 35% by weight-concentration aqueous hydrogen peroxide (for industrial use) and 474.8 g of metallic tin powder (manufactured by Yamaishi Kinzoku Co., Ltd., trade name: AT-Sn, No. 200) were added while cooling.

The addition of aqueous hydrogen peroxide and metallic tin was achieved by first adding 26.4 g (0.22 mol) of the metallic tin and then 44.3 g (0.46 mol) of the aqueous hydrogen peroxide gradually. After the reaction is completed (5 to 10 minutes), 26.4 g (0.22 mol) of the metallic tin and then 44.3 g (0.46 mol) of the aqueous hydrogen peroxide were added gradually. In this manner, the addition of the metallic tin and the following addition of the aqueous hydrogen peroxide were repeated 17 times at an interval of 5 to 10 minutes to perform the portionwise addition of (26.4 g of the metallic tin and 44.3 g of the aqueous hydrogen peroxide) ×17 times, and finally, 26.0 g of the metallic tin and then 43.9 g of the aqueous hydrogen peroxide were added to conduct totaling 18 times of portionwise addition.

Since the reaction is an exothermic reaction, the addition of the metallic tin elevated the temperature to 70 to 75° C. and after completion of the reaction, the temperature was lowered to 50 to 60° C. due to cooling. Therefore, the reaction temperature was 50 to 75° C. Upon the addition, the proportion of the hydrogen peroxide to the metallic tin was at a $H_2O_2$/Sn molar ratio of 2.09. The time required for addition of the aqueous hydrogen peroxide and the metallic tin was 3.0 hours. A suitable amount of water was replenished since water evaporates by the reaction. After completion of the reaction, 2730.9 g of a pale yellow, transparent aqueous solution of basic titanium-tin chloride composite salt was obtained. In the resulting aqueous solution of basic titanium-tin chloride composite salt, the titanium component was in a concentration of 5.85% by weight in terms of titanium oxide ($TiO_2$) and the tin component was in a concentration of 22.07% by weight in terms of tin oxide ($SnO_2$) and the molar ratio in terms of $TiO_2$/$SnO_2$ was 0.5. (Ti+Sn)/Cl molar ratio was 1.10.

Step (b): To 2569.7 g of the aqueous solution of basic titanium-tin chloride composite salt obtained in the step (a) was added 11407 g of water and 211 g of ammonia water of a concentration of 28% by weight to be diluted to a concentration of 5% by weight in terms of $TiO_2$+ $SnO_2$. This aqueous solution was hydrolyzed at 95° C. for 10 hours to obtain a slurry of flocculate of titanium oxide-tin oxide composite colloid having a primary particle size of 4 to 8 nm.

Step (c): The slurry of flocculate of titanium oxide-tin oxide composite colloid obtained in the step (b) was treated by repeating the operations of concentration→water-pouring→concentration using about 15 liters of water in an ultrafiltration apparatus to wash and remove excessive electrolytes and then peptized to obtain 15830 g of an acidic titanium oxide-tin oxide composite aqueous sol. The primary particle size of the titanium oxide-tin oxide composite colloid particles measured using an electron microscope was 4 to 8 nm.

Step (d): After adding 137 g of isopropylamine to 15830 g of the acidic titanium oxide-tin oxide composite aqueous sol obtained in the step (c) to render it alkaline, operations of concentration→water-pouring→concentration were repeated to wash and remove excessive electrolytes using about 24 liters of water in an ultrafiltration apparatus to obtain 14602 g of an alkaline titanium oxide-tin oxide composite aqueous sol. Further, the mixture was flown through a column packed with 200 ml of an anion exchange resin (Amberlite IRA-410, manufactured by Organo Co., Ltd.) to obtain 15273 g of an alkaline titanium oxide-tin oxide composite aqueous sol containing less anion. The sol was concentrated under reduced pressure in a rotary evaporator to obtain 4848.9 g of a titanium oxide-tin oxide composite aqueous concentrated sol. The obtained sol had a specific gravity of 1.120, a viscosity of 5.5 mPa·s, a pH of 9.92, a conductivity of 1230 $\mu$s/cm, a concentration of 3.04% by weight in terms of $TiO_2$, and a concentration of 11.46% by weight in terms of $SnO_2$.

Step (e): After adding 12 g of tartaric acid and 18 g of diisopropylamine to 1924.7 g of the alkaline titanium oxide-tin oxide composite aqueous concentrated sol obtained in the step (d) with stirring, the aqueous medium was substituted by methanol by a method of distilling off the water by gradually adding 40 liters of methanol under reduced pressure in a rotary evaporator to prepare 915 g of a titanium oxide-tin oxide composite methanol sol. The obtained methanol sol had a specific gravity of 1.096, a primary particle size of titanium oxide-tin oxide composite colloid particle of 4 to 8 nm, a viscosity of 3.5 mPa·s, a pH (1+1) of 7.38, a conductivity (1+1) of 1305 $\mu$s/cm, a concentration of 6.4% by weight in terms of $TiO_2$, a concentration of 24.1% by weight in terms of $SnO_2$, and a water content of 0.41% by weight.

Production Example 3
(Preparation of Titanium Oxide-tin Oxide Composite Sol)

Step (a): 587.5 g of titanium tetrachloride (27.2% by weight in terms of $TiO_2$, Cl being 32.0% by weight, manufactured by Sumitomo Citix Co., Ltd.) (159.8 g in terms of $TiO_2$) and 744.2 g of water were charged in a 3-liter jacketed glass separable flask to prepare 1331.7 g (concentration: 12.0% by weight in terms of $TiO_2$) of an aqueous titanium chloride solution.

The aqueous solution was warmed to 50° C. while stirring with a glass rod stirrer and then 255.0 g of 35% by weight-concentration aqueous hydrogen peroxide (for industrial use) and 118.7 g of metallic tin powder (manufactured by Yamaishi Kinzoku Co., Ltd., trade name: AT-Sn, No. 200) were added while cooling.

The addition of aqueous hydrogen peroxide and metallic tin was achieved by first adding 51.0 g (0.52 mol) of the aqueous hydrogen peroxide and then 23.74 g (0.2 mol) of the metallic tin gradually. After the reaction is completed (3 to 7 minutes), 51.0 g (0.52 mol) of the aqueous hydrogen peroxide and then 23.74 g (0.2 mol) of the metallic tin were added gradually. In this manner, the addition of the aqueous hydrogen peroxide and the following addition of the metallic tin were repeated 5 times at an interval of 3 to 7 minutes to effect after performing the portionwise addition of (51.0 g of the aqueous hydrogen peroxide and 23.74 g of the metallic tin)×5 times.

Since the reaction is an exothermic reaction, the addition of the metallic tin elevated the temperature to 70 to 75° C. and after completion of the reaction, the temperature was lowered to 50 to 60° C. due to cooling. Therefore, the reaction temperature was 50 to 75° C. Upon the addition, the proportion of the hydrogen peroxide to the metallic tin was at a $H_2O_2$/Sn molar ratio of 2.62. The time required for addition of the aqueous hydrogen peroxide and the metallic tin was 1.0 hour. A suitable amount of water was replenished since water evaporates by the reaction. After completion of the reaction, 1683.6 g of a pale yellow, transparent aqueous solution of basic titanium-tin chloride composite salt was obtained. In the resulting aqueous solution of basic titanium-tin chloride composite salt, the titanium component was in a concentration of 9.49% by weight in terms of titanium oxide ($TiO_2$) and the tin component was in a concentration of 8.95% by weight in terms of tin oxide ($SnO_2$) and the molar ratio in terms of $TiO_2$/$SnO_2$ was 2.0. (Ti+Sn)/Cl molar ratio was 0.57.

Step (b): To 1683.6 g of the aqueous solution of basic titanium-tin chloride composite salt obtained in the step (a) was added 4286.4 g of water and 240 g of ammonia water of a concentration of 28% by weight to be diluted to a concentration of 5% by weight in terms of $TiO_2$+ $SnO_2$. This aqueous solution was hydrolyzed at 94° C. for 10 hours to obtain a slurry of flocculate of titanium oxide-tin oxide composite colloid having a primary particle size of 4 to 8 nm.

Step (c): The slurry of flocculate of titanium oxide-tin oxide composite colloid obtained in the step (b) was treated by repeating the operations of concentration→water-pouring→concentration using about 15 liters of water in an ultrafiltration apparatus to wash and remove excessive electrolytes and then peptized to obtain 15830 g of an acidic titanium oxide-tin oxide composite aqueous sol. The primary particle size of the titanium oxide-tin oxide composite colloid particles measured using an electron microscope was 4 to 8 nm.

Step (d): After adding 137 g of isopropylamine to 7920 g of the acidic titanium oxide-tin oxide composite aqueous sol obtained in the step (c) to render it alkaline, operations of concentration→water-pouring→concentration were repeated to wash and remove excessive electrolytes using about 24 liters of water in an ultrafiltration apparatus to obtain 14602 g of an alkaline titanium oxide-tin oxide composite aqueous sol. Further, the mixture was flown through a column packed with 600 ml of an anion exchange resin (Amberlite IRA-410, manufactured by Organo Co., Ltd.) to obtain 15273 g of an alkaline titanium oxide-tin oxide composite aqueous sol containing less anion. The sol was concentrated under reduced pressure in a rotary evaporator to obtain 2112.8 g of a titanium oxide-tin oxide composite aqueous concentrated sol. The obtained sol had a specific gravity of 1.132, a viscosity of 12.0 mPa·s, a pH of 9.61, a conductivity of 1320 μs/cm, a concentration of 7.4% by weight in terms of $TiO_2$, and a concentration of 7.0% by weight in terms of $SnO_2$.

Step (e): After adding 12 g of tartaric acid and 18 g of diisopropylamine to 1877.1 g of the alkaline titanium oxide-tin oxide composite aqueous concentrated sol obtained in the step (d) with stirring, the aqueous medium was substituted by methanol by a method of distilling off the water by gradually adding 40 liters of methanol under reduced pressure in a rotary evaporator to prepare 915 g of a titanium oxide-tin oxide composite methanol sol. The obtained methanol sol had a specific gravity of 1.078, a primary particle size of titanium oxide-tin oxide composite colloid particle of 4 to 8 nm, a viscosity of 6.8 mPa·s, a pH (1+1) of 7.64, a conductivity (1+1) of 1150 p s/cm, a concentration of 15.44% by weight in terms of $TiO_2$, a concentration of 14.56% by weight in terms of $SnO_2$, and a water content of 0.50% by weight.

Production Example 4

(Preparation of Titanium Oxide-zirconium Oxide-tin Oxide Composite Sol)

Step (a'): 587.5 g of titanium tetrachloride (27.2% by weight in terms of $TiO_2$, Cl being 32.0% by weight, manufactured by Sumitomo Citix Co., Ltd.) (159.8 g in terms of $TiO_2$), 57.2 g of zirconium oxycarbonate (43.0% by weight in terms of $ZrO_2$, manufactured by Daiichi Rare Elements Chemistry Co., Ltd.) (24.6 g in terms of $ZrO_2$) and 686.99 g of water were charged in a 3-liter jacketed glass separable flask to prepare 1331.7 g (12.0% by weight in terms of $TiO_2$, 1.85% by weight in terms of $ZrO_2$) of a mixed aqueous solution of titanium chloride and zirconium oxychloride. The aqueous solution was warmed to 60° C. while stirring with a glass rod stirrer and then 923.5 g of 35% by weight-concentration aqueous hydrogen peroxide (for industrial use) and 451.1 g of metallic tin powder (manufactured by Yamaishi Kinzoku Co., Ltd., trade name: AT-Sn, No. 200) were added while cooling.

The addition of aqueous hydrogen peroxide and metallic tin was achieved by first adding 25.0 g (0.21 mol) of the metallic tin and then 51.3 g (0.53 mol) of the aqueous hydrogen peroxide gradually. After the reaction is completed (5 to 10 minutes), 25.0 g (0.21 mol) of the metallic tin and then 51.3 g (0.53 mol) of the aqueous hydrogen peroxide were added gradually. In this manner, the addition of the metallic tin and the following addition of the aqueous hydrogen peroxide was repeated 17 times at an interval of 5 to 10 minutes to perform the portionwise addition of (25.0 g of the metallic tin and 51.3 g of the aqueous hydrogen peroxide)×17 times, finally 26.1 g of the metallic tin and then 51.4 g of the aqueous hydrogen peroxide were added to conduct totaling 18 times of portionwise addition.

Since the reaction is an exothermic reaction, the addition the metallic tin elevated the temperature to 80 to 85° C. and after completion of the reaction, the temperature was lowered to 60 to 70° C. due to cooling. Therefore, the reaction temperature was 60 to 85° C. Upon the addition, the proportion of the hydrogen peroxide to the metallic tin was at a $H_2O_2/Sn$ molar ratio of 2.52. The time required for addition of the aqueous hydrogen peroxide and the metallic tin was 2.5 hours. A suitable amount of water was replenished since water evaporates by the reaction. After completion of the reaction, 2680 g of a pale yellow, transparent aqueous solution of basic titanium-zirconium-tin chloride composite salt was obtained. In the resulting aqueous solution of basic titanium-zirconium-tin chloride composite salt, the titanium component was in a concentration of 5.96% by weight in terms of titanium oxide ($TiO_2$), the zirconium component was in a concentration of 0.92% by weight in terms of zirconium oxide ($ZrO_2$) and the tin component was in a concentration of 21.37% by weight in terms of tin oxide ($SnO_2$) and the molar ratio in terms of $ZrO_2/TiO_2$ was 0.1, and the molar ratio in terms of $TiO_2/(ZrO_2+SnO_2)$ was 0.5. (Ti+Zr+Sn)/Cl molar ratio was 1.13.

Step (b'): To 1770.5 g of the aqueous solution of basic titanium-zirconium-tin chloride composite salt obtained in the step (a') was added 155.4 g of ammonia water of a concentration of 28% by weight and 8074.1 g of water to be diluted to a concentration of 5% by weight in terms of $TiO_2+ZrO_2+SnO_2$. This aqueous solution was hydrolyzed at 95 to 98° C. for 12 hours to obtain a slurry of flocculate of titanium oxide-zirconium oxide-tin oxide composite colloid having a primary particle size of 4 to 8 nm.

Step (c'): The slurry of flocculate of titanium oxide-zirconium oxide-tin oxide composite colloid obtained in the step (b') was treated by repeating the operations of concentration→water-pouring→concentration using about 20 liters of water in an ultrafiltration apparatus to wash and remove excessive electrolytes and then peptized to obtain 7400 g of an acidic titanium oxide-zirconium oxide-tin oxide composite aqueous sol. The primary particle size of the titanium oxide-zirconium oxide-tin oxide composite colloid particles measured using an electron microscope was 4 to 8 nm.

Step (d'): After adding 10.0 g of isopropylamine to 9000 g of the acidic titanium oxide-zirconium oxide-tin oxide composite aqueous sol obtained in the step (c'), the mixture was flown through a column packed with 500 ml of an anion exchange resin (Amberlite IRA-410, manufactured by Organo Co., Ltd.) to obtain 10277 g of an alkaline titanium oxide-zirconium oxide-tin oxide composite aqueous sol. The sol was concentrated in an ultrafiltration apparatus to obtain 3506.4 g of a titanium oxide-zirconium oxide-tin oxide composite aqueous concentrated sol. The obtained sol had a specific gravity of 1.138, a viscosity of 7.5 mPa·s, a pH of 10.11, a conductivity of 970 μs/cm, a concentration of 3.0% by weight in terms of $TiO_2$, a concentration of 0.46% by weight in terms of $ZrO_2$ and a concentration of 10.8% by weight in terms of $SnO_2$.

Step (e'): After adding 6.85 g of tartaric acid and 10.3 g of diisopropylamine to 1205.3 g of the alkaline titanium oxide-zirconium oxide-tin oxide composite aqueous concentrated sol obtained in the step (d') with stirring, the aqueous medium was substituted by methanol by a method of distilling off the water by gradually adding 20 liters of methanol under reduced pressure in a rotary evaporator to prepare 563 g of a titanium oxide-zirconium oxide-tin oxide composite methanol sol. The obtained methanol sol had a specific gravity of 1.104, a primary particle size of titanium oxide-zirconium oxide-tin oxide composite colloid particle of 4 to 8 nm, a viscosity of 3.4 mPa·s, a pH (1+1) of 7.50, a conductivity (1+1) of 1335 μs/cm, a concentration of 6.42% by weight in terms of $TiO_2$, a concentration of 0.98% by weight in terms of $ZrO_2$ and a concentration of 23.1 % by weight in terms of $SnO_2$, and a water content of 0.46% by weight.

Production Example 5

(Preparation of Titanium Oxide-zirconium Oxide-tin Oxide Composite Sol)

Step (a'): 587.5 g of titanium tetrachloride (27.2% by weight in terms of $TiO_2$, Cl being 32.0% by weight, manufactured by Sumitomo Citix Co., Ltd.) (159.8 g in terms of $TiO_2$), 114.6 g of zirconium oxycarbonate (43.0% by weight in terms of $ZrO_2$, manufactured by Daiichi Rare Elements Chemistry Co., Ltd.) (49.2 g in terms of $ZrO_2$) and 629.6 g of water were charged in a 3-liter jacketed glass separable flask to prepare 1331.7 g (12.0% by weight in terms of $TiO_2$, 3.7% by weight in terms of $ZrO_2$) of a mixed aqueous solution of titanium chloride and zirconium oxychloride.

The aqueous solution was warmed to 60° C. while stirring with a glass rod stirrer and then 358.0 g of 35% by weight-concentration aqueous hydrogen peroxide (for industrial use) and 190.0 g of metallic tin powder (manufactured by Yamaishi Kinzoku Co., Ltd., trade name: AT-Sn, No. 200) were added while cooling.

The addition of aqueous hydrogen peroxide and metallic tin was achieved by first adding 35.8 g (0.37 mol) of the aqueous hydrogen peroxide and then 19.0 g (0.16 mol) of the metallic tin gradually. After the reaction is completed (5 to 10 minutes), 35.8 g (0.37 mol) of the aqueous hydrogen peroxide and then 19.0 g (0.16 mol) of the metallic tin were added gradually. In this manner, the addition of the aqueous hydrogen peroxide and the addition of the metallic tin was repeated 10 times at an interval of 5 to 10 minutes to perform the portionwise addition of (35.8 g of the aqueous hydrogen peroxide and 19.0 g of the metallic tin)×10 times.

Since the reaction is an exothermic reaction, the addition of the metallic tin elevated the temperature to 80 to 85° C. and after completion of the reaction, the temperature was lowered to 60 to 70° C. due to cooling. Therefore, the reaction temperature was 60 to 85° C. Upon the addition, the proportion of the hydrogen peroxide to the metallic tin was at a $H_2O_2/Sn$ molar ratio of 2.3. The time required for addition of the aqueous hydrogen peroxide and the metallic tin was 2.5 hours. A suitable amount of water was replenished since water evaporates by the reaction. After completion of the reaction, 1780 g of a pale yellow, transparent aqueous solution of basic titanium-zirconium-tin chloride composite salt was obtained. In the resulting aqueous solution of basic titanium-zirconium-tin chloride composite salt, the titanium component was in a concentration of 8.98% by weight in terms of titanium oxide ($TiO_2$), the zirconium component was in a concentration of 2.76% by weight in terms of zirconium oxide ($ZrO_2$) and the tin component was in a concentration of 13.55% by weight in terms of tin oxide ($SnO_2$) and the molar ratio in terms of $ZrO_2/TiO_2$ was 0.2, and the molar ration in terms of $TiO_2/(ZrO_2+SnO_2)$ was 1.0. (Ti+Zr+Sn)/Cl molar ratio was 0.76.

Step (b'): To 1780 g of the aqueous solution of basic titanium-zirconium-tin chloride composite salt obtained in the step (a') was added 259 g of ammonia water of a concentration of 28% by weight and 6964 g of water to dilute it to a concentration of 5% by weight in terms of $TiO_2+ZrO_2+SnO_2$. This aqueous solution was hydrolyzed at 95 to 98° C. for 12 hours to obtain a slurry of flocculate of titanium oxide-zirconium oxide-tin oxide composite colloid having a primary particle size of 4 to 8 nm.

Step (c'): The slurry of flocculate of titanium oxide-zirconium oxide-tin oxide composite colloid obtained in the step (b') was treated by repeating the operations of concentration→water-pouring→concentration using about 20 liters of water in an ultrafiltration apparatus to wash and remove excessive electrolytes and then peptized to obtain 8400 g of an acidic titanium oxide-zirconium oxide-tin oxide composite aqueous sol. The primary particle size of the titanium oxide-zirconium oxide-tin oxide composite colloid particles measured using an electron microscope was 4 to 8 nm.

Step (d'): After adding 27.0 g of isopropylamine to 9000 g of the acidic titanium oxide-zirconium oxide-tin oxide composite aqueous sol obtained in the step (c') to render it alkaline, further operations of concentrations→water-pouring→concentration were repeated to wash and remove excessive electrolytes using about 20 liters of water in an ultrafiltration apparatus to obtain 8000 g of an alkaline titanium oxide-zirconium oxide-tin oxide composite aqueous sol. The sol was flown through a column packed with 500 ml of an anion exchange resin (Amberlite IRA-410, manufactured by Organo Co., Ltd.) to obtain 9050 g of an alkaline titanium oxide-zirconium oxide-tin oxide composite aqueous sol containing much less electrolytes (anions). The sol was concentrated in an ultrafiltration apparatus to obtain 300 g of a titanium oxide-zirconium oxide-tin oxide composite aqueous concentrated sol. The obtained sol had a specific gravity of 1.140, a viscosity of 10.3 mPa·s, a pH of 10.31, a conductivity of 1105 μs/cm, a concentration of 5.18% by weight in terms of $TiO_2$, a concentration of 1.58% by weight in terms of $ZrO_2$ and a concentration of 7.77% by weight in terms of $SnO_2$.

Step (e'): After adding 6.85 g of tartaric acid and 10.3 g of diisopropylamine to 1180.4 g of the alkaline titanium oxide-zirconium oxide-tin oxide composite aqueous concentrated sol obtained in the step (d') with stirring, the aqueous medium was substituted by methanol by a method of distilling off the water by gradually adding 20 liters of methanol under reduced pressure in a rotary evaporator to prepare 563 g of a titanium oxide-zirconium oxide-tin oxide composite methanol sol. The obtained methanol sol had a specific gravity of 1.106, a primary particle size of titanium oxide-zirconium oxide-tin oxide composite colloid particle of 4 to 8 nm, a viscosity of 3.8 mPa·s, a pH (1+1) of 7.85, a conductivity (1+1) of 1465 μs/cm, a concentration of 10.87% by weight in terms of $TiO_2$, a concentration of 3.33% by weight in terms of $ZrO_2$ and a concentration of 16.4% by weight in terms of $SnO_2$, and a water content of 0.42% by weight.

Production Example 6

(Preparation of Titanium Oxide-zirconium Oxide-tin Oxide Composite Sol)

Step (a'): 587.5 g of titanium tetrachloride (27.2% by weight in terms $TiO_2$, Cl being 32.0% by weight, manufactured by Sumitomo Citix Co., Ltd.) (159.8 g in terms of $TiO_2$), 57.2 g of zirconium oxycarbonate (43.0% by weight in terms of $ZrO_2$, manufactured by Daiichi Rare Elements Chemistry Co., Ltd.) (24.6 g in terms of $ZrO_2$) and 687.0 g of water were charged in a 3-liter jacketed glass separable flask to prepare 1331.7 g (12.0% by weight in terms of $TiO_2$, 1.85% by weight in terms of $ZrO_2$) of a mixed aqueous solution of titanium chloride and zirconium oxychloride. The aqueous solution was warmed to 60° C. while stirring with a glass rod stirrer and then 194.5 g of 35% by weight-concentration aqueous hydrogen peroxide (for industrial use) and 95.0 g of metallic tin powder (manufactured by Yamaishi Kinzoku Co., Ltd., trade name AT-Sn, No. 200) were added while cooling.

The addition of aqueous hydrogen peroxide and metallic tin was achieved by first adding 38.9 g (0.40 mol) of the aqueous hydrogen peroxide and then 19.0 g (0.16 mol) of the metallic tin gradually. After the reaction is completed (5 to 10 minutes), 38.9 g of the aqueous hydrogen peroxide and then 19.0 g of the metallic tin were added gradually. In this manner, the addition of the aqueous hydrogen peroxide and the following addition of the metallic tin was repeated 5 times at an interval of 5 to 10 minutes to perform the portionwise addition of (38.9 g of the aqueous hydrogen peroxide and 19.0 g of the metallic tin)×5 times.

Since the reaction is an exothermic reaction, the addition of the metallic tin elevated the temperature to 80 to 85° C. and after completion of the reaction, the temperature was lowered to 60 to 70° C. due to cooling. Therefore, the reaction temperature was 60 to 85° C. Upon the addition, the proportion of the hydrogen peroxide to the metallic tin was at a $H_2O_2/Sn$ molar ratio of 2.50. The time required for addition of the aqueous hydrogen peroxide and the metallic tin was 1.0 hour. A suitable amount of water was replenished since water evaporates by the reaction. After completion of the reaction, 1605 g of a pale yellow, transparent aqueous solution of basic titanium-zirconium-tin chloride composite salt was obtained. In the resulting aqueous solution of basic titanium-zirconium-tin chloride composite salt, the titanium component was in a concentration of 9.96% by weight in terms of titanium oxide ($TiO_2$), the zirconium component was in a concentration of 1.53% by weight in terms of zirconium oxide ($ZrO_2$) and the tin component was in a concentration of 7.51% by weight in terms of tin oxide ($SnO_2$) and the molar ratio in terms of $ZrO_2/TiO_2$ was 0.1, and the molar ratio in terms of $TiO_2/(ZrO_2+SnO_2)$ was 2.0. (Ti+Zr+Sn)/Cl molar ratio was 0.53.

Step (b'): To 1605 g of the aqueous solution of basic titanium-zirconium-tin chloride composite salt obtained in the step (a') was added 250 g of ammonia water of a concentration of 28% by weight and 4244 g of water to be diluted to a concentration of 5% by weight in terms of $TiO_2+ZrO_2+SnO_2$. This aqueous solution was hydrolyzed at 95 to 98° C. for 12 hours to obtain a slurry of flocculate of titanium oxide-zirconium oxide-tin oxide composite colloid having a primary particle size of 4 to 8 nm.

Step (c'): The slurry of flocculate of titanium oxide-zirconium oxide-tin oxide composite colloid obtained in the step (b') was treated by repeating the operations of concentration→water-pouring→concentration using about 20 liters of water in an ultrafiltration apparatus to wash and remove excessive electrolytes and then peptized to obtain 5470 g of an acidic titanium oxide-zirconium oxide-tin oxide composite aqueous sol. The primary particle size of the titanium oxide-zirconium oxide-tin oxide composite colloid particles measured using an electron microscope was 4 to 8 nm.

Step (d'): After adding 6.0 g of isopropylamine to 5470 g of the acidic titanium oxide-zirconium oxide-tin oxide composite aqueous sol obtained in the step (c'), the mixture was flown through a column packed with 500 ml of an anion exchange resin (Amberlite IRA-410, manufactured by Organo Co., Ltd.) to obtain 6128 g of an alkaline titanium oxide-zirconium oxide-tin oxide composite aqueous sol. The sol was concentrated in an ultrafiltration apparatus to obtain 2098 g of a titanium oxide-zirconium oxide-tin oxide composite aqueous concentrated sol. The obtained sol had a specific gravity of 1.105, a viscosity of 13.3 mPa·s, a pH of 10.31, a conductivity of 1375 μs/cm, a concentration of 3.0% by weight in terms of $TiO_2$, a concentration of 0.46% by weight in terms of $ZrO_2$ and a concentration of 10.8% by weight in terms of $SnO_2$.

Step (e'): After adding 6.85 g of tartaric acid and 10.3 g of diisopropylamine to 1205.3 g of the alkaline titanium oxide-zirconium oxide-tin oxide composite aqueous concentrated sol obtained in the step (d') with stirring, the aqueous medium was substituted by methanol by a method of distilling off the water by gradually adding 20 liters of methanol under reduced pressure in a rotary evaporator to prepare 563 g of a titanium oxide-zirconium oxide-tin oxide composite methanol sol. The obtained methanol sol had a specific gravity of 1.104, a primary particle size of titanium oxide-zirconium oxide-tin oxide composite colloid particle of 4 to 8 nm, a viscosity of 3.4 mPa·s, a pH (1+1) of 7.50, a conductivity (1+1) of 1335 μs/cm, a concentration of 7.49% by weight in terms of $TiO_2$, a concentration of 1.15% by weight in terms of $ZrO_2$ and a concentration of 5.66% by weight in terms of $SnO_2$, and a water content of 0.44% by weight.

Production Example 7
(Preparation of Titanium Oxide-cerium Oxide-tin Oxide Composite Sol)

Step (a"): 587.5 g of titanium tetrachloride (27.2% by weight in terms of $TiO_2$, Cl being 32.0% by weight, manufactured by Sumitomo Citix Co., Ltd.) (159.8 g in terms of $TiO_2$), 60.5 g of cerium carbonate (99.99% by weight in terms of $Ce_2(CO_3)_3·8H_2O$, manufactured by Kanto Kagaku Co., Ltd.) (17.2 g in terms of $CeO_2$) and 687.7 g of water were charged in a 3-liter jacketed glass separable flask to prepare 1331.7 g (12.0% by weight in terms of $TiO_2$, 2.58% by weight in terms of $CeO_2$) of a mixed aqueous solution of titanium chloride and cerium chloride. The aqueous solution was warmed to 60° C. while stirring with a glass rod stirrer and then 947.6 g of 35% by weight-concentration aqueous hydrogen peroxide (for industrial use) and 462.9 g of metallic tin powder (manufactured by Yamaishi Kinzoku Co., Ltd., trade name: AT-Sn, No. 200) were added while cooling.

The addition of aqueous hydrogen peroxide and metallic tin was achieved by first adding 25.5 g (0.21 mol) of the metallic tin and then 52.2 g (0.54 mol) of the aqueous hydrogen peroxide gradually. After the reaction is completed (5 to 10 minutes), 25.5 g (0.21 mol) of the metallic tin and then 52.2 g (0.54 mol) of the aqueous hydrogen peroxide were added gradually. In this manner, the addition of the metallic tin and the following addition of the aqueous hydrogen peroxide were repeated 17 times at an interval of 5 to 10 minutes to perform the portionwise addition of (25.5 g of the metallic tin and 52.2 g of the aqueous hydrogen peroxide)×17 times, finally 29.4 g of the metallic tin and then 60.2 g of the aqueous hydrogen peroxide was added to conduct totaling 18 times of portionwise addition.

Since the reaction is an exothermic reaction, the addition of the metallic tin elevated the temperature to 80 to 85° C. and after completion of the reaction, the temperature was lowered to 60 to 70° C. due to cooling. Therefore, the reaction temperature was 60 to 85° C. Upon the addition, the proportion of the hydrogen peroxide to the metallic tin was at a $H_2O_2/Sn$ molar ratio of 2.57. The time required for addition of the aqueous hydrogen peroxide and the metallic tin was 2.5 hours. A suitable amount of water was replenished since water evaporates by the reaction. After completion of the reaction, 2635 g of a pale yellow, transparent aqueous solution of basic titanium-cerium-tin chloride composite salt was obtained. In the resulting aqueous solution of basic titanium-cerium-tin chloride composite salt, the titanium component was in a concentration of 6.06% by weight in terms of titanium oxide ($TiO_2$), the cerium component was in a concentration of 0.65% by weight in terms of cerium oxide ($CeO_2$) and the tin component was in a concentration of 22.30% by weight in terms of tin oxide ($SnO_2$) and the molar ratio in terms of $CeO_2/TiO_2$ was 0.05, and the molar ratio in terms of $TiO_2/(CeO_2+SnO_2)$ was 0.5. (Ti+Ce+Sn)/Cl molar ratio was 1.13.

Step (b"): To 1726.3 g of the aqueous solution of basic titanium-cerium-tin chloride composite salt obtained in the step (a") was added 151.5 g of ammonia water of a concentration of 28% by weight and 8142.4 g of water to be diluted to a concentration of 5% by weight in terms of $TiO_2+CeO_2+SnO_2$. This aqueous solution was hydrolyzed at 95 to 98° C. for 12 hours to obtain a slurry of flocculate of titanium oxide-cerium oxide-tin oxide composite colloid having a primary particle size of 4 to 8 nm.

Step (c"): The slurry of flocculate of titanium oxide-cerium oxide-tin oxide composite colloid obtained in the step (b") was treated by repeating the operations of concentration→water pouring→concentration using about 20 liters of water in an ultrafiltration apparatus to wash and remove excessive electrolytes and then peptized to obtain 7400 g of an acidic titanium oxide-cerium oxide-tin oxide composite aqueous sol. The primary particle size of the titanium oxide-cerium oxide-tin oxide composite colloid particles measured using an electron microscope was 4 to 8 nm.

Step (d"): After adding 10.0 g of isopropylamine to 7400 g of the acidic titanium oxide-cerium oxide-tin oxide composite aqueous sol obtained in the step (c"), the mixture was flown through a column packed with 500 ml of an anion exchange resin (Amberlite IRA-410, manufactured by Organo Co., Ltd.) to obtain 10277 g of an alkaline titanium oxide-cerium oxide-tin oxide composite aqueous sol. The sol was concentrated in an ultrafiltration apparatus to obtain 3055.6 g of a titanium oxide-cerium oxide-tin oxide composite aqueous concentrated sol. The obtained sol had a specific gravity of 1.158, a viscosity of 12.8 mPa·s, a pH of 9.56, a conductivity of 1100 µs/cm, a concentration of 3.43% by weight in terms of $TiO_2$, a concentration of 0.37% by weight in terms of $CeO_2$ and a concentration of 12.6% by weight in terms of $SnO_2$.

Step (e"): After adding 7.2 g of tartaric acid and 10.8 g of diisopropylamine to 1097.6 g of the alkaline titanium oxide-cerium oxide-tin oxide composite aqueous concentrated sol obtained in the step (d") with stirring, the aqueous medium was substituted by methanol by a method of distilling off the water by gradually adding 30 liters of methanol under reduced pressure in a rotary evaporator to prepare 585 g of a titanium oxide-cerium oxide-tin oxide composite methanol sol. The obtained methanol sol had a specific gravity of 1.104, a viscosity of 3.0 mPa·s, a primary particle size of titanium oxide-cerium oxide-tin oxide composite colloid particle of 4 to 8 nm, a pH (1+1) of 7.34, a conductivity (1+1) of 1355 µs/cm, a concentration of 6.38% by weight in terms of $TiO_2$, a concentration of 0.69% by weight in terms of $CeO_2$ and a concentration of 23.43% by weight in terms of $SnO_2$, and a water content of 0.43% by weight.

Production Example 8
(Preparation of Titanium Oxide-cerium Oxide-tin Oxide Composite Sol)

Step (a"): 587.5 g of titanium tetrachloride (27.2% by weight in terms of $TiO_2$, Cl being 32.0% by weight, manufactured by Sumitomo Citix Co., Ltd.) (159.8 g in terms of $TiO_2$), 121.0 g of cerium carbonate (99.99% by weight in terms of $Ce_2(CO_3)_3 \cdot 8H_2O$, manufactured by Kanto Kagaku Co., Ltd.) (34.4 g in terms of $CeO_2$) and 623.2 g of water were charged in a 3-liter-jacketed glass separable flask to prepare 1331.7 g (12.0% by weight in terms of $TiO_2$, 2.58% by weight in terms of $CeO_2$) of a mixed aqueous solution of titanium chloride and cerium chloride. The aqueous solution was warmed to 60° C. while stirring with a glass rod stirrer and then 358.0 g of 35% by weight-concentration aqueous hydrogen peroxide (for industrial use) and 190.0 g of metallic tin powder (manufactured by Yamaishi Kinzoku Co., Ltd., trade name: AT-Sn, No. 200) were added while cooling.

The addition of aqueous hydrogen peroxide and metallic tin was achieved by first adding 35.8 g (0.37 mol) of the aqueous hydrogen peroxide and then 19.0 g (0.16 mol) of the metallic tin gradually. After the reaction is completed (5 to 10 minutes), 35.8 g (0.37 mol) of the aqueous hydrogen peroxide and then 19.0 g (0.16 mol) of the metallic tin were added gradually. In this manner, the addition of the aqueous hydrogen peroxide and the following addition of the metallic tin were repeated 10 times at an interval of 5 to 10 minutes to perform the portionwise addition of (35.8 g of the aqueous hydrogen peroxide and 19.0 g of the metallic tin)×10 times.

Since the reaction is an exothermic reaction, the addition of the metallic tin elevated the temperature to 80 to 85° C. After completion of the reaction, the temperature was lowered to 60 to 70° C. due to cooling. Therefore, the reaction temperature was 60 to 85° C. Upon the addition, the proportion of the hydrogen peroxide to the metallic tin was at a $H_2O_2/Sn$ molar ratio of 2.31. The time required for addition of the aqueous hydrogen peroxide and the metallic tin was 2.5 hours. A suitable amount of water was replenished since water evaporates by the reaction. After completion of the reaction, 1780 g of a pale yellow, transparent aqueous solution of basic titanium-cerium-tin chloride composite salt was obtained. In the resulting aqueous solution of basic titanium-cerium-tin chloride composite salt, a concentration of titanium oxide was 8.98% by weight, a concentration of cerium oxide was 1.93% by weight and a concentration of tin oxide was 13.55% by weight, and the molar ratio in terms of $CeO_2/TiO_2$ was 0.1, and the molar ratio in terms of $TiO_2/(CeO_2+SnO_2)$ was 1.0. (Ti+Ce+Sn)/Cl molar ratio was 0.76.

Step (b"): To 1780 g of the aqueous solution of basic titanium-cerium-tin chloride composite salt obtained in the step (a") was added 259 g of ammonia water of a concentration of 28% by weight and 6661 g of water to be diluted to a concentration of 5% by weight in terms of $TiO_2+CeO_2+SnO_2$. This aqueous solution was hydrolyzed at 95 to 98° C. for 12 hours to obtain a slurry of flocculate of titanium oxide-cerium oxide-tin oxide composite colloid having a primary particle size of 4 to 8 nm.

Step (c"): The slurry of flocculate of titanium oxide-cerium oxide-tin oxide composite colloid obtained in the step (b") was treated by repeating the operations of concentration→water-pouring→concentration using about 20 liters of water in an ultrafiltration apparatus to wash and remove excessive electrolytes and then peptized to obtain 8400 g of an acidic titanium oxide-cerium oxide-tin oxide composite aqueous sol. The primary particle size of the titanium oxide-cerium oxide-tin oxide composite colloid particles measured using an electron microscope was 4 to 8 nm.

Step (d"): After adding 27.0 g of isopropylamine to 8400 g of the titanium oxide-cerium oxide-tin oxide composite aqueous sol obtained in the step (c") to render it alkaline, further operations of concentration→water-pouring→concentration were repeated to wash and remove excessive electrolytes using about 20 liters of water in an ultrafiltration apparatus to obtain 7000 g of an alkaline titanium oxide-cerium oxide-tin oxide composite aqueous sol. The sol was flown through a column packed with 500 ml of an anion exchange resin (Amberlite IRA-410, manufactured by Organo Co., Ltd.) to obtain 8050 g of an alkaline titanium oxide-cerium oxide-tin oxide composite aqueous sol containing much less electrolytes (anions). The sol was concentrated in an ultrafiltration apparatus to obtain 3307 g of a titanium oxide-cerium oxide-tin oxide composite aqueous concentrated sol. The obtained sol had a specific gravity of 1.128, a viscosity of 10.5 mPa·s, a pH of 9.35, a conductivity of 790 μs/cm, a concentration of 4.74% by weight in terms of $TiO_2$, a concentration of 1.02% by weight in terms of $CeO_2$ and a concentration of 7.14% by weight in terms of $SnO_2$.

Step (e"): After adding 6.85 g of tartaric acid and 10.3 g of diisopropylamine to 1327.5 g of the alkaline titanium oxide-cerium oxide-tin oxide composite aqueous concentrated sol obtained in the step (d") with stirring, the aqueous medium was substituted by methanol by a method of distilling off the water by gradually adding 20 liters of methanol under reduced pressure in a rotary evaporator to prepare 550 g of a titanium oxide-cerium oxide-tin oxide composite methanol sol. The obtained methanol sol had a specific gravity of 1.102, a primary particle size of titanium oxide-cerium oxide-tin oxide composite colloid particle of 4 to 8 nm, a viscosity of 2.7 mPa·s, a pH (1+1) of 7.22, a conductivity (1+1) of 1415 μs/cm, a concentration of 11.21% by weight in terms of $TiO_2$, a concentration of 2.41% by weight in terms of $CeO_2$ and a concentration of 16.88% by weight in terms of $SnO_2$, and a water content of 0.48% by weight.

Production Example 9
(Preparation of Titanium Oxide-cerium Oxide-tin Oxide Composite Sol)

Step (a"): 587.5 g of titanium tetrachloride (27.2% by weight in terms $TiO_2$, Cl being 32.0% by weight, manufactured by Sumitomo Citix Co., Ltd.) (159.8 g in terms of $TiO_2$), 60.5 g of cerium carbonate (99.99% by weight in terms of $Ce_2(CO_3)_3 \cdot 8H_2O$, manufactured by Kanto Kagaku Co., Ltd.) (17.2 g in terms of $CeO_2$) and 687.7 g of water were charged in a 3-liter jacketed glass separable flask to prepare 1331.7 g (12.0% by weight in terms of $TiO_2$, 2.58% by weight in terms of $CeO_2$) of a mixed aqueous solution of titanium chloride and cerium chloride.

The aqueous solution was warmed to 60° C. while stirring with a glass rod stirrer and then 194.5 g of 35% by weight-concentration aqueous hydrogen peroxide (for industrial use) and 95.0 g of metallic tin powder (manufactured by Yamaishi Kinzoku Co., Ltd., trade name: AT-Sn, No. 200) were added while cooling.

The addition of aqueous hydrogen peroxide and metallic tin was achieved by first adding 38.9 g (0.40 mol) of the aqueous hydrogen peroxide and then 19.0 g (0.16 mol) of the metallic tin gradually. After the reaction is completed (5 to 10 minutes), 38.9 g (0.40 mol) of the aqueous hydrogen peroxide and then 19.0 g (0.16 mol) of the metallic tin were added gradually. In this manner, the addition of the aqueous hydrogen peroxide and the following addition of the metallic tin were repeated 5 times at an interval of 5 to 10 minutes to perform the portionwise addition of (38.9 g of the aqueous hydrogen peroxide and 19.0 g of the metallic tin)×5 times. Since the reaction is an exothermic reaction, the addition of the metallic tin elevated the temperature to 80 to 85° C. After completion of the reaction, the temperature was lowered to 60 to 70° C. due to cooling. Therefore, the reaction temperature was 60 to 85° C. Upon the addition, the proportion of the hydrogen peroxide to the metallic tin was at a $H_2O_2/Sn$ molar ratio of 2.50. The time required for addition of the aqueous hydrogen peroxide and the metallic tin was 1.0 hour. A suitable amount of water was replenished since water evaporates by the reaction. After completion of the reaction, 1610 g of a pale yellow, transparent aqueous solution of basic titanium-cerium-tin chloride composite salt was obtained. In the resulting aqueous solution of basic titanium-cerium-tin chloride composite salt, the titanium component was in a concentration of 9.87% by weight in terms of titanium oxide ($TiO_2$), the cerium component was in a concentration of 1.07% by weight in terms of cerium oxide ($CeO_2$) and the tin component was in a concentration of 7.49% by weight in terms of tin oxide ($SnO_2$) and the molar ratio in terms of $CeO_2/TiO_2$ was 0.05, and the molar ratio in terms of $TiO_2/(CeO_2+SnO_2)$ was 2.0. (Ti+Ce+Sn)/Cl molar ratio was 0.57.

Step (b"): To 1610 g of the aqueous solution of basic titanium-cerium-tin chloride composite salt obtained in the step (a") was added 250 g of ammonia water of a concentration of 28% by weight and 4074 g of water to dilute it to a concentration of 5% by weight in terms of $TiO_2+CeO_2+SnO_2$. This aqueous solution was hydrolyzed at 95 to 98° C. for 12 hours to obtain a slurry of flocculate of titanium oxide-cerium oxide-tin oxide composite colloid having a primary particle size of 4 to 8 nm.

Step (c"): The slurry of flocculate of titanium oxide-cerium oxide-tin oxide composite colloid obtained in the step (b") was treated by repeating the operations of concentration→water-pouring→concentration using about 20 liters of water in an ultrafiltration apparatus to wash and remove excessive electrolytes and then peptized to obtain 5400 g of an acidic titanium oxide-cerium oxide-tin oxide composite aqueous sol. The primary particle size of the titanium oxide-cerium oxide-tin oxide composite colloid particles measured using an electron microscope was 4 to 8 nm.

Step (d"): After adding 6.0 g of isopropylamine to 5400 g of the acidic titanium oxide-cerium oxide-tin oxide composite aqueous sol obtained in the step (c"), the mixture was flown through a column packed with 500 ml of an anion exchange resin (Amberlite IRA-410, manufactured by Organo Co., Ltd.) to obtain 6150 g of an alkaline titanium oxide-cerium oxide-tin oxide composite aqueous sol. The sol was concentrated in an ultrafiltration apparatus to obtain 2056 g of a titanium oxide-cerium oxide-tin oxide composite aqueous concentrated sol. The obtained sol had a specific gravity of 1.135, a viscosity of 10.3 mPa·s, a pH of 9.31, a conductivity of 975 μs/cm, a concentration of 7.55% by weight in terms of $TiO_2$, a concentration of 0.82% by weight in terms of $CeO_2$ and a concentration of 5.73% by weight in terms of $SnO_2$.

Step (e"): After adding 6.85 g of tartaric acid and 10.3 g of diisopropylamine to 1214.5 g of the alkaline titanium oxide-cerium oxide-tin oxide composite aqueous concentrated sol obtained in the step (d") with stirring, the aqueous medium was substituted by methanol by a method of distilling off the water by gradually adding 20 liters of methanol under reduced pressure in a rotary evaporator to prepare 553 g of a titanium oxide-cerium oxide-tin oxide composite methanol sol. The obtained methanol sol had a specific gravity of 1.104, a primary particle size of titanium oxide-cerium oxide-tin oxide composite colloid particle of 4 to 8 nm, a viscosity of 2.9 mPa·s, a pH (1+1) of 7.33, a conductivity (1+1) of 1435 μs/cm, a concentration of 16.33% by weight in terms of $TiO_2$, a concentration of 1.77% by weight in terms of $CeO_2$ and a concentration of 12.39% by weight in terms of $SnO_2$, and a water content of 0.41% by weight.

Comparative Production Example 1
(Preparation of Titanium Oxide Methanol Sol)

587.5 g of titanium tetrachloride (27.2% by weight in terms $TiO_2$, Cl being 32.0% by weight, manufactured by Sumitomo Citix Co., Ltd.) (159.8 g in terms of $TiO_2$) and 2608.5 g of water were charged in a 3-liter jacketed glass separable flask to prepare 3196 g (concentration: 5.0% by weight in terms of $TiO_2$) of an aqueous titanium chloride solution.

After adding 50 g of ammonia water of a concentration of 28% by weight to the aqueous solution while stirring with a glass rod stirrer, the aqueous solution was hydrolyzed at 95° C. for 10 hours to obtain a slurry of flocculate of titanium oxide colloid having a primary particle size of 4 to 8 nm.

The slurry of flocculate of titanium oxide colloid was filtered by suction using 5B filter, and then about 40 liters of water was poured to wash and remove excessive electrolytes to obtain a 620 g wet cake of titanium oxide. The obtained cake was dispersed in 2576 g of water and then 8.0 g of isopropylamine to render it alkaline and the dispersion was flowed through a column packed with 200 ml of an anion exchange resin (Amberlite IRA-410, manufactured by Organo Co., Ltd.) to obtain 3890 g of an alkaline titanium oxide aqueous sol. The sol was concentrated under reduced pressure in a rotary evaporator to obtain 1070 g of an alkaline titanium oxide aqueous concentrated sol. After adding 12.1 g of tartaric acid and 26.1 g of diisopropylamine to the sol with stirring, the aqueous medium was substituted by methanol by a method of distilling off the water by gradually adding 25 liters of methanol under reduced pressure in a rotary evaporator to prepare 775.2 g of a titanium oxide methanol sol. The obtained methanol sol had a specific gravity of 0.970, a primary particle size of titanium oxide colloid particle of 4 to 8 nm, a viscosity of 4.5 mPa·s, a pH (1+1) of 8.98, a conductivity of 1600 μs/cm, a concentration of 20.2% by weight in terms of $TiO_2$, and a water content of 3.4% by weight.

Test Example 1

The composite sols in Production Examples 1 to 9 in a state of sol, have a very light colloidal color, but do not present colloidal color and are colorless transparent when dried on a glass plate. After coating the sols of Production Examples 1 to 9 and Comparative Production Example 1 on a glass plate in the form of a thin film using an applicator and drying at 150° C., ultraviolet rays were irradiated thereto for 1 hour and light-resistance tests were carried out. Change in color of the coating film before and after the irradiation of ultraviolet rays was observed visually to evaluate light resistance. The results obtained are shown below. Greater change (turning pale blue) was indicated by symbol X and smaller change was indicated by symbol o.

TABLE 1

| Sample\Evaluation Item | Light Resistance |
| --- | --- |
| Production Example 1 | o |
| Production Example 2 | o |
| Production Example 3 | o |
| Production Example 4 | o |
| Production Example 5 | o |
| Production Example 6 | o |
| Production Example 7 | o |
| Production Example 8 | o |
| Production Example 9 | o |
| Comparative Example 1 | X |

As the results shown in Table 1, the sol obtained by the production method of the present application of which titanium oxide, tin oxide, zirconium oxide and cerium oxide were not a mere mixture, but bonding

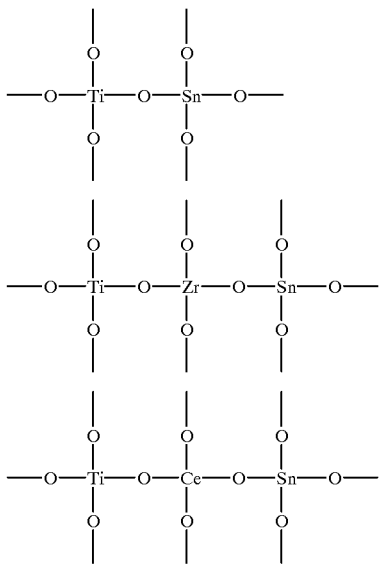

at atomic level of these components is assumed to be generated exhibits excellent light resistance.

Test Example 2

The titanium oxide-tin oxide composite sol obtained in Production Example 2 and the titanium oxide-zirconium oxide-tin oxide composite sol obtained in Production Example 4 were adjusted to have a concentration of 20% by weight, and charged in a 30-ml screw type sample bottle and ultraviolet rays from an UV lamp were irradiated for 30 minutes. The distance from the UV lamp to the sample bottle was set to 18 cm. Changes in color of the sols after the irradiation (after 5 minutes, after 30 minutes, and after 60 minutes) were observed using a color difference meter to measure and evaluate YI (yellow index value). YI (yellow index value) is an index for indicating yellow color of the target in the sense of degree of yellowness. The UV lamp used was OHD-320M (manufactured by ORC Co., Ltd.). The color difference meter used was TC-1800MK II (manufactured by Tokyo Denshoku Co., Ltd.) and measurement was performed by reflected light using a 2C light source. The results of YI measurement are shown below.

TABLE 2

| | YI (Yellow Index) | | | |
| --- | --- | --- | --- | --- |
| | Value before | Change in YI value | | |
| | UV irradiation (blank) | After 5 min. | After 30 min. | After 60 min. |
| Production Example 2 | 33.37 | −44.53 | −39.54 | −40.62 |
| Production Example 4 | 30.30 | 25.27 | 32.38 | 34.17 |

The titanium oxide-tin oxide composite sol and titanium oxide-zirconium oxide-tin oxide composite sol were pale yellow liquids as observed visually before the irradiation of ultraviolet rays.

The titanium oxide-tin oxide composite sol showed a considerable shift of YI value to the minus side (in the direction of coloring bluish) after the irradiation of ultraviolet rays. This cause is considered to be attributable to the reduction of Ti from tetravalent to divalent in the titanium oxide-tin oxide composite sol.

On the other hand, the titanium oxide-zirconium oxide-tin oxide composite sol showed no change in YI value after the irradiation of ultraviolet rays nor change in color visually. This is considered in that reduction of Ti from tetravalent to divalent is inhibited by the addition of zirconium oxide.

Also, in the titanium oxide-cerium oxide-tin oxide composite sol, the cerium component likewise inhibits the reduction of Ti from tetravalent to divalent.

(Preparation of Coating Liquid)

Example 1

In a glass-vessel equipped with a magnetic stirrer was added 105.3 parts by weight of γ-glycidoxypropyltrimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane. Then, 397.8 parts by weight of the titanium oxide-tin oxide composite methanol sol obtained in Production Example 1 described above (concentration: 30.5% by weight in terms of $TiO_2+SnO_2$), 65 parts by weight of butyl cellosolve, and further 4.2 parts by weight of aluminum acetylacetonate were added to 142.1 parts by weight of the above-mentioned partial hydrolysate of γ-glycidoxypropyltrimethoxysilane, and the mixture was sufficiently stirred and then filtered to obtain a coating liquid.

Example 2

In a glass-vessel equipped with a magnetic stirrer was added 105.3 parts by weight of γ-glycidoxypropyltrimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane. Then, 397.8 parts by weight of the titanium oxide-tin oxide composite methanol sol obtained in Production Example 2 described above (concentration: 30.5% by weight in terms of $TiO_2+SnO_2$), 65 parts by weight of butyl cellosolve, and further 4.2 parts by weight of aluminum acetylacetonate were added to 142.1 parts by weight of the above-mentioned partial hydrolysate of γ-glycidoxypropyltrimethoxysilane, and the mixture was sufficiently stirred and then filtered to obtain a coating liquid.

Example 3

In a glass-vessel equipped with a magnetic stirrer was added 22.3 parts by weight of tetraethoxysilane and 77.9 parts by weight of γ-glycidoxypropylmethyldiethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of tetraethoxysilane and γ-glycidoxypropylmethyldiethoxysilane. Then, 397.8 parts by weight of the titanium oxide-tin oxide composite methanol sol obtained in Production Example 1 described above (concentration: 30.5% by weight in terms of $TiO_2+SnO_2$), 65 parts by weight of butyl cellosolve, and further 2.6 parts by weight of aluminum acetylacetonate and 0.5 parts by weight of ammonium perchlorate were added to 137 parts by weight of the above-mentioned partial hydrolysate of tetraethoxysilane and γ-glycidoxypropylmethyldiethoxysilane, and the mixture was sufficiently stirred and then filtered to obtain a coating liquid.

Example 4

In a glass-vessel equipped with a magnetic stirrer was added 74.2 parts by weight of γ-glycidoxypropyltrimethoxysilane and 31.1 parts by weight of γ-glycidoxypropylmethyldimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane and γ-glycidoxypropylmethyldimethoxysilane. Then, 397.8 parts by weight of the titanium oxide-tin oxide composite methanol sol obtained in Production Example 2 described above (concentration: 30.5% by weight in terms of $TiO_2+SnO_2$), 65 parts by weight of butyl cellosolve, and further 4.2 parts by weight of aluminum acetylacetonate were added to 142.1 parts by weight of the above-mentioned partial hydrolysate of γ-glycidoxypropyltrimethoxysilane and γ-glycidoxypropylmethyldimethoxysilane, and the mixture was sufficiently stirred and then filtered to obtain a coating liquid.

Example 5

In a glass-vessel equipped with a magnetic stirrer was added 37.1 parts by weight of γ-glycidoxypropyltrimethoxysilane, 37.1 parts by weight of γ-glycidoxypropylmethyldimethoxysilane and 23.7 parts by weight of tetraethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane, γ-glycidoxypropylmethyldimethoxysilane and tetraethoxysilane. Then, 397.8 parts by weight of the titanium oxide-tin oxide composite methanol sol obtained in Production Example 2 described above (concentration: 30.5% by weight in terms of $TiO_2+SnO_2$), 65 parts by weight of butyl cellosolve, and further 4.2 parts by weight of aluminum acetylacetonate were added to 134.7 parts by weight of the above-mentioned partial hydrolysate of γ-glycidoxypropyltrimethoxysilane, γ-glycidoxypropylmethyldimethoxysilane and tetraethoxysilane, and the mixture was sufficiently stirred and then filtered to obtain a coating liquid.

Example 6

In a glass-vessel equipped with a magnetic stirrer was added 105.3 parts by weight of γ-glycidoxypropyltrimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane. Then, 397.8 parts by weight of the titanium oxide-zirconium oxide-tin oxide composite methanol sol obtained in Production Example 4 described above (concentration: 30.5% by weight in terms of $TiO_2+ZrO_2+SnO_2$), 65 parts by weight of butyl cellosolve, and further 4.2 parts by weight of aluminum acetylacetonate were added to 142.1 parts by weight of the above-mentioned partial hydrolysate of γ-glycidoxypropyltrimethoxysilane, and the mixture was sufficiently stirred and then filtered to obtain a coating liquid.

Example 7

In a vessel equipped with a magnetic stirrer was added 105.3 parts by weight of γ-glycidoxypropyltrimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane. Then, 397.8 parts by weight of the titanium oxide-zirconium oxide-tin oxide composite methanol sol obtained in Production Example 5 described above (concentration: 30.5% by weight in terms of $TiO_2+ZrO_2+SnO_2$), 65 parts by weight of butyl cellosolve, and further 4.2 parts by weight of aluminum acetylacetonate were added to 142.1 parts by weight of the above-mentioned partial hydrolysate of γ-glycidoxypropyltrimethoxysilane, and the mixture was sufficiently stirred and then filtered to obtain a coating liquid.

Example 8

In a glass-vessel equipped with a magnetic stirrer was added 22.3 parts by weight of tetraethoxysilane and 77.9 parts by weight of γ-glycidoxypropylmethyldiethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of tetraethoxysilane and γ-glycidoxypropylmethyldiethoxysilane. Then, 397.8 parts by weight of the titanium oxide-zirconium oxide-tin oxide composite methanol sol obtained in Production Example 4 described above (concentration: 30.5% by weight in terms of $TiO_2+ZrO_2+SnO_2$), 65 parts by weight of butyl cellosolve, and further 2.6 parts by weight of aluminum acetylacetonate and 0.5 parts by weight of ammonium perchlorate were added to 137 parts by weight of the above-mentioned partial hydrolysate of tetraethoxysilane and γ-glycidoxypropylmethyldiethoxysilane, and the mixture was sufficiently stirred and then filtered to obtain a coating liquid.

Example 9

In a glass-vessel equipped with a magnetic stirrer was added 74.2 parts by weight of γ-glycidoxypropyltrimethoxysilane and 31.1 parts by weight of γ-glycidoxypropylmethyldimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of 74.2 parts by weight of γ-glycidoxypropyltrimethoxysilane and 31.1 parts by weight of γ-glycidoxypropylmethyldimethoxysilane. Then, 397.8 parts by weight of the titanium oxide-zirconium oxide-tin oxide composite methanol sol obtained in Production Example 5 described above (concentration: 30.5% by weight in terms of $TiO_2+ZrO_2+SnO_2$), 65 parts by weight of butyl cellosolve, and further 4.2 parts by weight of aluminum acetylacetonate were added to 142.1 parts by weight of the above-mentioned partial hydrolysate of γ-glycidoxypropyltrimethoxysilane and γ-glycidoxypropylmethyldimethoxysilane, and the mixture was sufficiently stirred and then filtered to obtain a coating liquid.

Example 10

In a glass-vessel equipped with a magnetic stirrer was added 37.1 parts by weight of γ-glycidoxypropyltrimethoxysilane, 37.1 parts by weight of γ-glycidoxypropylmethyldimethoxysilane and 23.7 parts by weight of tetraethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane, γ-glycidoxypropylmethyldimethoxysilane and tetraethoxysilane. Then, 397.8 parts by weight of the titanium oxide-zirconium oxide-tin oxide composite methanol sol obtained in Production Example 5 described above (concentration: 30.5% by weight in terms of $TiO_2+ZrO_2+SnO_2$), 65 parts by weight of butyl cellosolve, and further 4.2 parts by weight of aluminum acetylacetonate were added to 134.7 parts by weight of the above-mentioned partial hydrolysate of γ-glycidoxypropyltrimethoxysilane γ-glycidoxypropylmethyldimethoxysilane and tetraethoxysilane, and the mixture was sufficiently stirred and then filtered to obtain a coating liquid.

Example 11

In a glass-vessel equipped with a magnetic stirrer was added 105.3 parts by weight of γ-glycidoxypropyltrimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane. Then, 397.8 parts by weight of the titanium oxide-cerium oxide-tin oxide composite methanol sol obtained in Production Example 7 described above (concentration: 30.5% by weight in terms of $TiO_2+CeO_2+SnO_2$), 65 parts by weight of butyl cellosolve, and further 4.2 parts by weight of aluminum acetylacetonate were added to 142.1 parts by weight of the above-mentioned partial hydrolysate of γ-glycidoxypropyltrimethoxysilane, and the mixture was sufficiently stirred and then filtered to obtain a coating liquid.

Example 12

In a glass-vessel equipped with a magnetic stirrer was added 105.3 parts by weight of γ-glycidoxypropyltrimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane. Then, 397.8 parts by weight of the titanium oxide-cerium oxide-tin oxide composite methanol sol obtained in Production Example 8 described above (concentration: 30.5% by weight in terms of $TiO_2+CeO_2+SnO_2$), 65 parts by weight of butyl cellosolve, and further 4.2 parts by weight of aluminum acetylacetonate were added to 142.1 parts by weight of the above-mentioned partial hydrolysate of γ-glycidoxypropyltrimethoxysilane, and the mixture was sufficiently stirred and then filtered to obtain a coating liquid.

Example 13

In a glass-vessel equipped with a magnetic stirrer was added 22.3 parts by weight of tetraethoxysilane and 77.9 parts by weight of γ-glycidoxypropylmethyldiethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of tetraethoxysilane and γ-glycidoxypropylmethyldiethoxysilane. Then, 397.8 parts by weight of the titanium oxide-cerium oxide-tin oxide composite methanol sol obtained in Production Example 7 described above (concentration: 30.5% by weight in terms of $TiO_2+CeO_2+SnO_2$), 65 parts by weight of butyl cellosolve, and further 2.6 parts by weight of aluminum acetylacetonate and 0.5 parts by weight of ammonium perchlorate were added to 137.0 parts by weight of the above-mentioned partial hydrolysate of tetraethoxysilane and γ-glycidoxypropylmethyldiethoxysilane, and the mixture was sufficiently stirred and then filtered to obtain a coating liquid.

Example 14

In a vessel equipped with a magnetic stirrer was added 74.2 parts by weight of γ-glycidoxypropyltrimethoxysilane and 31.1 parts by weight of γ-glycidoxypropylmethyldimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane and γ-glycidoxypropylmethyldimethoxysilane. Then, 397.8 parts by weight of the titanium oxide-cerium oxide-tin oxide composite methanol sol obtained in Production Example 8 described above (concentration: 30.5% by weight in terms of $TiO_2+CeO_2+SnO_2$), 65 parts by weight of butyl cellosolve, and further 4.2 parts by weight of aluminum acetylacetonate were added to 142.1 parts by weight of the above-mentioned partial hydrolysate of γ-glycidoxypropyltrimethoxysilane and γ-glycidoxypropylmethyldimethoxysilane, and the mixture was sufficiently stirred and then filtered to obtain a coating liquid.

Example 15

In a glass-vessel equipped with a magnetic stirrer was added 37.1 parts by weight of γ-glycidoxypropyltrimethoxysilane, 37.1 parts by weight of γ-glycidoxypropylmethyldimethoxysilane and 23.7 parts by weight of tetraethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane, γ-glycidoxypropylmethyldimethoxysilane and tetraethoxysilane. Then, 397.8 parts by weight of the titanium oxide-cerium oxide-tin oxide composite methanol sol obtained in Production Example 8 described above (concentration: 30.5% by weight in terms of $TiO_2+CeO_2+SnO_2$), 65 parts by weight of butyl cellosolve, and further 4.2 parts by weight of aluminum acetylacetonate were added to 134.7 parts by weight of the above-mentioned partial hydrolysate of γ-glycidoxypropyltrimethoxysilane, γ-glycidoxypropylmethyldimethoxysilane and tetraethoxysilane and the mixture was sufficiently stirred and then filtered to obtain a coating liquid.

Comparative Example 1

In a glass-vessel equipped with a magnetic stirrer was added 105.3 parts by weight of γ-glycidoxypropyltrimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane. Then, 600.6 parts by weight of the titanium oxide methanol sol obtained in Comparative Production Example 1 described above (a concentration of $TiO_2$ is 20.2% by weight), 65 parts by weight of butyl cellosolve, and further 4.2 parts by weight of aluminum acetylacetonate were added to 142.1 parts by weight of the above-mentioned partial hydrolysate of γ-glycidoxypropyltrimethoxysilane, and the mixture was sufficiently stirred and then filtered to obtain a coating liquid.

Comparative Example 2

In a glass-vessel equipped with a magnetic stirrer was added 105.3 parts by weight of γ-glycidoxypropyltrimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane. Next, 433.3 parts by weight of a modified tin oxide methanol sol having a particle size of about 18 nm [a $(WO_3+SnO_2)/SnO_2$ weight ratio of 0.46, containing 30.0% by weight of total metal oxides in terms of $WO_3+SnO_2$], formed from tin oxide colloid particles having a particle size of 7.2 nm as nuclei whose surface being covered with a tungsten oxide-tin oxide composite colloid particles having a $WO_3/SnO_2$ weight ratio of 5.12 and a particle size of 5 nm, 65 parts by weight of butyl cellosolve, and further 4.2 parts by weight of aluminum acetylacetonate were added to 142.1 parts by weight of the above-mentioned partial hydrolysate of γ-glycidoxypropyltrimethoxysilane and the mixture was sufficiently stirred and then filtered to obtain a coating liquid.

Comparative Example 3

In a glass-vessel equipped with a magnetic stirrer was added 105.3 parts by weight of γ-glycidoxypropyltrimethoxysilane corresponding to the above-described component A, and 36.8 parts by weight of 0.01 N hydrochloric acid were dropwise added over 3 hours while keeping the liquid temperature at 5 to 10° C. and stirring. After completion of the dropwise addition, stirring was continued for 0.5 hour to obtain a partial hydrolysate of γ-glycidoxypropyltrimethoxysilane. Then, 650.0 parts by weight of the colloidal silica methanol sol (20% of solid part and 15 nm of average particle size), 65 parts by weight of butyl cellosolve, and further 4.2 parts of aluminum acetylacetonate were added to 142.1 parts by weight of the above-mentioned partial hydrolysate of γ-glycidoxypropyltrimethoxysilane and the mixture was sufficiently stirred and then filtered to obtain a coating liquid.

Test Example 3
(Formation of Cured Film)

Plates of a commercially available polycarbonate having refractive index of $n_D$=1.59 were provided, to which was coated the coating compositions obtained in Examples 1 to 15 and Comparative Examples 1 to 3, respectively and subjected to heat treatment at 120° C. for 2 hours to cure the coating films to prepare specimens of an optical element.

The films comprising the coating compositions obtained in Examples 1 to 15 and Comparative Examples 1 to 3 on polycarbonate were named Example Films 1 to 15 and Comparative Example Films 1 to 3 and subjected to the following tests and the results obtained are shown in Tables 3 and 4.

(Marring Resistance Test)

The specimens of the above-mentioned optical element were marred with steel wool #0000 and resistance to marring was observed visually. The criteria of judgment were as follows.
A: Almost no flaws when marred strongly.
B: Considerable flaws when marred strongly.
C: Flaws identical to those on the optical element.

(Test on the Existence of Interference Fringes)

Under fluorescent lamp the specimens of optical element were observed visually. The criteria for the judgment were as follows.

A: Substantially no interference fringe was observed.
B: Interference fringes were observed slightly.
C: Considerable interference fringes were observed.

(Adhesion Test)

A surface of each specimen of the optical element was cross-cut at an interval of 1 mm to form 100 squares and an adhesive tape (trade name: Cello-Tape, manufactured by Nichiban Co., Ltd). was applied onto the cross-cut area strongly and the adhesive tape was rapidly peeled off and whether or not the cured film was peeled off after the peeling of the adhesive tape was examined. No occurrence of peeling in the cured film was judged to be good and occurrence of peeling was judged to be failure.

(Hot Water Resistance Test)

Each sample of the optical element was dipped in a hot water at 80° C. for 2 hours and the adhesion test as described above was performed.

(Transparency Test)

In a dark room, under the light from a fluorescent lamp, the occurrence of clouding in the specimens of the optical element was examined visually. The criteria for the judgment were as follows.
A: Substantially no clouding observed.
B: Clouding was observed slightly.
C: Considerable clouding was observed.

(Weatherability Test)

Specimens (optical element) prepared by providing anti-reflecting deposited film of an inorganic oxide on the cured film of each of the above-described specimens of the optical element. The specimens were exposed to outdoor environment for 1 month and changes in appearance of the specimens (optical element) were visually and judged.

TABLE 3

| Example Film | Marring Resistance | Interference Fringes | Adhesion | Hot Water Resistance | Transparency | Weatherability |
|---|---|---|---|---|---|---|
| 1 | A | A | good | good | A | normal |
| 2 | A | A | good | good | A | normal |
| 3 | A | A | good | good | A | normal |
| 4 | A | A | good | good | A | normal |
| 5 | A | A | good | good | A | normal |
| 6 | A | A | good | good | A | normal |
| 7 | A | A | good | good | A | normal |
| 8 | A | A | good | good | A | normal |
| 9 | A | A | good | good | A | normal |
| 10 | A | A | good | good | A | normal |
| 11 | A | A | good | good | A | normal |
| 12 | A | A | good | good | A | normal |
| 13 | A | A | good | good | A | normal |
| 14 | A | A | good | good | A | normal |
| 15 | A | A | good | good | A | normal |

TABLE 4

| Comparative Example Film | Marring Resistance | Interference Fringes | Adhesion | Hot Water Resistance | Transparency | Weatherability |
|---|---|---|---|---|---|---|
| 1 | A | A | good | peeling | A | colored blue |
| 2 | A | A | good | partly peeling | A | slightly colored yellow |
| 3 | A | C | good | good | A | normal |

The optical element having a cured film of the coating composition of the present invention showed excellent results in the above-described tests.

On the other hand, the use of titanium oxide particles as the component (B) in place of the titanium oxide-tin oxide composite colloid particles resulted in a deteriorated hot water resistance and caused the phenomenon that the cured film colored blue by the sun's rays, so that reduction in weatherability was poor.

The use of the modified tin oxide colloid particles having tin oxide colloid particles as core and the tungsten oxide-tin oxide complex colloid particles covering the surfaces thereof as the component (B) in place of the titanium oxide-tin oxide composite colloid particles resulted in deteriorated hot water resistance and caused the phenomenon of yellowing of the curing film by the sun light so that weatherability was poor.

The use of the silica colloid particles as the component (B) in place of the titanium oxide-tin oxide composite colloid particles resulted in low refractive index of the cured film, which generated a difference in refractive index between the cured film and plastics substrate to generate interference fringes on the surface of the optical element, and hence such is undesirable.

Effect of the Invention

The composite sol obtained by the present invention has high transparency and its dry film has a refractive index of about 1.8 to 2.0. The sol has both high bonding strength and high hardness as well as good light resistance, weatherability, antistatic properties, wear resistance, adhesion, etc.

The sol has sufficient stability for being supplied as an industrial product. The sol can be mixed stably with resin emulsions, surfactants, silanes such as ethyl silicate, partial hydrolysates of silane coupling agents, etc.

The sol of the present invention having such properties is particularly useful as a component for forming a hard coat film on a surface of plastics lenses, films, or plastics molded parts to improve refractive index, dyeability, chemical resistance, water resistance, light resistance, weatherability, wear resistance, marring resistance, etc. Since it has high refractive index, it is effective as a component of an antireflection film.

The sol of the present invention can be used in applications such as ceramics starting material for dielectric materials, piezoelectric materials, sensor materials, etc., catalysts, binders for refractories, antistatic agents such as fiber, paper, plastics, inorganic ion exchangers, microfillers for ultraviolet absorbents, microfillers for far infrared radiation, surface treating agents for metals, glasses, or ceramics, and the like.

The cured film obtained from the coating composition of the present invention forms a coating layer having improved marring resistance, surface hardness, transparency, heat resistance, light resistance, weatherability, and in particular, water resistance. Further, adhesion of antireflection layers (inorganic oxides or fluorides, etc.), vacuum evaporated metal layer to be formed on the coating layer is also good.

The optical element of the present invention is excellent in marring resistance, surface hardness, transparency, heat resistance, light resistance, weather resistance, and in particular water resistance and in addition it shows no interference fringe when coated on an element having a refractive index of 1.54 or higher to provide an optical element that has high transparency and good appearance.

The optical element having a cured film composed of the coating composition of the present invention can be used for lenses for glasses and in addition as lenses for cameras, automotive windowpanes, or optical filters for liquid-crystal displays, plasma displays, etc.

What is claimed is:

1. A method for producing a titanium oxide-tin oxide composite sol, comprising reacting a titanium salt and metallic tin in the presence of hydrogen peroxide in an aqueous medium.

2. A method for producing a titanium oxide-tin oxide composite sol, comprising the steps (a), (b) and (c):

(a): simultaneously or alternately adding aqueous hydrogen peroxide and metallic tin to an aqueous titanium salt solution while retaining a $H_2O_2/Sn$ molar ratio at 2 to 3 to generate an aqueous titanium-tin basic salt solution containing a titanium component and a tin component in terms of $TiO_2$ and $SnO_2$ in a $TiO_2/SnO_2$ molar ratio of 0.25 to 10 and a total concentration of 5 to 50% by weight in terms of $TiO_2$ and $SnO_2$, (b): retaining the aqueous titanium-tin basic salt solution obtained in the step (a) at a temperature of 50 to 100° C. over 0.1 to 100 hours to generate a flocculate of a titanium oxide-tin oxide composite colloid, and (c): removing electrolytes in a slurry of the flocculate of the titanium oxide-tin oxide composite colloid generated in the step (b).

3. A method for producing a titanium oxide-zirconium oxide-tin oxide composite sol, comprising reacting a titanium salt, a zirconium oxysalt and metallic tin in the presence of hydrogen peroxide in an aqueous medium.

4. A method for producing a titanium oxide-zirconium oxide-tin oxide composite sol, comprising the steps (a'), (b') and (c'):

(a'): simultaneously or alternately adding aqueous hydrogen peroxide and metallic tin to a mixed aqueous solution of a titanium salt and a zirconium oxysalt while retaining a $H_2O_2/Sn$ molar ratio at 2 to 3 to generate an aqueous titanium-zirconium-tin basic salt solution containing a titanium component, a zirconium component and a tin component in terms of $TiO_2$, $ZrO_2$ and $SnO_2$ in a $ZrO_2/TiO_2$ molar ratio of 0.05 to 1.0 and in a $TiO_2/(ZrO_2+SnO_2)$ molar ratio of 0.25 to 10 and a total concentration of 5 to 50% by weight in terms of $TiO_2$, $ZrO_2$ and $SnO_2$, (b'): retaining the aqueous titanium-zirconium-tin basic salt solution obtained in the step (a') at a temperature of 50 to 100° C. over 0.1 to 100 hours to generate a flocculate of a titanium oxide-zirconium oxide-tin oxide composite colloid, and (c'): removing electrolytes in a slurry of the flocculate of a titanium oxide-zirconium oxide-tin oxide composite colloid generated in the step (b').

5. A method for producing a titanium oxide-cerium oxide-tin oxide composite sol, comprising reacting a titanium salt, a cerium salt and metallic tin in the presence of hydrogen peroxide in an aqueous medium.

6. A method for producing a titanium oxide-cerium oxide-tin oxide composite sol, comprising the steps (a"), (b") and (c"):

(a"): simultaneously or alternately adding aqueous hydrogen peroxide and metallic tin to a mixed aqueous solution of a titanium salt and a cerium salt while retaining a $H_2O_2/Sn$ molar ratio at 2 to 3 to generate an aqueous titanium-cerium-tin basic salt solution containing a titanium component, a cerium component and a tin component in terms of $TiO_2$, $CeO_2$ and $SnO_2$ in a $CeO_2/TiO_2$ molar ratio of 0.01 to 0.5 and in a $TiO_2/$ ($CeO_2$+$SnO_2$) molar ratio of 0.25 to 10 and a total concentration of 5 to 50% by weight in terms of $TiO_2$, $CeO_2$ and $SnO_2$, (b"): retaining the aqueous titanium-cerium-tin basic salt solution obtained in the step (a") at a temperature of 50 to 100° C. over 0.1 to 100 hours to generate flocculate of a titanium oxide-cerium oxide-tin oxide composite colloid, and (c"): removing electrolytes in a slurry of the flocculate of a titanium oxide-cerium oxide-tin oxide composite colloid generated in the step (b").

7. A coating composition comprising the following components (A) and (B):

component (A): at least one silicon-containing substance selected from the group consisting of organosilicon compounds of the formula (I):

$(R^1)_a(R^3)_b Si(OR^2)_{4-(a+b)}$ (I)

(wherein $R^1$ and $R^3$ independently represent an alkyl group, an aryl group, a halogenated alkyl group, a halogenated aryl group, an alkenyl group, or an organic group having an epoxy group, an acryloyl group, a methacryloyl group, a mercapto group, an amino group or a cyano group and bonded to the silicon atom through an Si—C bond, $R^2$ represents an alkyl group, an alkoxyalkyl group, or an acyl group and contains 1 to 8 carbon atoms, a and b independently represent an integer of 0, 1, or 2, and a+b is an integer of 0, 1, or 2) and the formula (II):

$[(R^4)_c Si(OX)_{3-c}]_2 Y$ (II)

(wherein $R^4$ represents an alkyl group having 1 to 5 carbon atoms, X represents an alkyl group or an acyl group and contains 1 to 4 carbon atoms, Y represents a methylene group or an alkylene group having 2 to 20 carbon atoms, and c represents an integer of 0 or 1) and hydrolysates thereof, component (B): at least one compound selected from the group consisting of a titanium oxide-tin oxide composite colloid particle having a primary particle size of 2 to 20 nm, a titanium oxide-zirconium oxide-tin oxide composite colloid particle having a primary particle size of 2 to 20 nm, and a titanium oxide-cerium oxide-tin oxide composite colloid particle having a primary particle size of 2 to 20 nm.

8. A coating composition according to claim 7, wherein the component (B) is a titanium oxide-tin oxide composite colloid particle having a primary particle size of 2 to 20 nm.

9. A coating composition according to claim 7, wherein the component (B) is a titanium oxide-zirconium oxide-tin oxide composite colloid particle having a primary particle size of 2 to 20 nm.

10. A coating composition according to claim 7, wherein the component (B) is a titanium oxide-cerium oxide-tin oxide composite colloid particle having a primary particle size of 2 to 20 nm.

11. An optical element having on the surface thereof a cured film comprising the coating composition as claimed in claim 7.

12. An optical element having on the surface thereof a cured film comprising the coating composition as claimed in claim 8.

13. An optical element having on the surface thereof a cured film comprising the coating composition as claimed in claim 9.

14. An optical element having on the surface thereof a cured film comprising the coating composition as claimed in claim 10.

* * * * *

UNITED STATES PATENT AND TRADEMARK OFFICE
CERTIFICATE OF CORRECTION

PATENT NO. : 6,296,943 B1
DATED : October 2, 2001
INVENTOR(S) : Yoshitane Watanabe et al.

It is certified that error appears in the above-identified patent and that said Letters Patent is hereby corrected as shown below:

Title page,
Replace the following:
[73]  Assignee:  Nissan Chemical Industries, Ltd., Tokyo (JP)

[30]  Foreign Application Priority Data
Mar. 3, 1997    (JP)................................9-47832
Mar. 3, 1997    (JP)................................9-47833
Mar. 4, 1997    (JP)................................9-49214
Mar. 4, 1997    (JP)................................9-49215
Mar. 5, 1997    (JP)................................9-50172
Mar. 5, 1997    (JP)................................9-50173

Signed and Sealed this

Fifth Day of March, 2002

Attest:

*Attesting Officer*

JAMES E. ROGAN
*Director of the United States Patent and Trademark Office*